US012596256B2

(12) United States Patent
Imai

(10) Patent No.: US 12,596,256 B2
(45) Date of Patent: Apr. 7, 2026

(54) DISPLAY DEVICE

(71) Applicant: SONY SEMICONDUCTOR SOLUTIONS CORPORATION, Kanagawa (JP)

(72) Inventor: Satoshi Imai, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 315 days.

(21) Appl. No.: 18/245,101

(22) PCT Filed: Sep. 13, 2021

(86) PCT No.: PCT/JP2021/033547
§ 371 (c)(1),
(2) Date: Mar. 13, 2023

(87) PCT Pub. No.: WO2022/070863
PCT Pub. Date: Apr. 7, 2022

(65) Prior Publication Data
US 2023/0350207 A1 Nov. 2, 2023

(30) Foreign Application Priority Data
Sep. 29, 2020 (JP) ................................. 2020-162870

(51) Int. Cl.
*G02B 27/01* (2006.01)
*H04N 13/344* (2018.01)
(52) U.S. Cl.
CPC ............................... *G02B 27/0172* (2013.01)
(58) Field of Classification Search
CPC .......... G02B 27/0172; G02B 2027/014; H04N 13/344
See application file for complete search history.

(56) References Cited

U.S. PATENT DOCUMENTS

2014/0111865 A1* 4/2014 Kobayashi ......... G02B 27/0172
359/633
2020/0225400 A1 7/2020 Stannard

FOREIGN PATENT DOCUMENTS

JP 07-043506 A 2/1995
JP 2000-267041 A 9/2000
(Continued)

OTHER PUBLICATIONS

International Search Report and Written Opinion of PCT Application No. PCT/JP2021/033547, issued on Nov. 16, 2021, 12 pages of ISRWO.

*Primary Examiner* — Thomas A Hollweg
*Assistant Examiner* — Erin D Chiem
(74) *Attorney, Agent, or Firm* — CHIP LAW GROUP

(57) ABSTRACT

Provided is a display device that includes an image display device, a transparent member, and a light reflecting portion. The transparent member includes a first surface facing an observer, a light incident surface, and a second surface that totally reflects light incident from the light incident surface. The first surface includes a first portion and a second portion. A part of light emitted from the image display device is incident from the light incident surface, totally reflected by the second surface, reflected by the light reflecting portion, emitted from the first portion, and reaches a pupil of the observer, and another part of the light emitted from the image display device is incident from the light incident surface, collides with the second portion and does not reach the pupil of the observer.

15 Claims, 19 Drawing Sheets

(56)         References Cited

FOREIGN PATENT DOCUMENTS

| | | | | | |
|----|------|---|---|--------|--------------|
| JP | 2001021853 | A | * | 1/2001 | |
| JP | 2007-094175 | A | | 4/2007 | |
| JP | 2011-053367 | A | | 3/2011 | |
| JP | 2014-085425 | A | | 5/2014 | |
| JP | 2015-194550 | A | | 11/2015 | |
| JP | 2016042136 | A | * | 3/2016 | .......... G02B 17/006 |
| JP | 2018-004764 | A | | 1/2018 | |
| JP | 2018-165744 | A | | 10/2018 | |
| JP | 2020-521170 | A | | 7/2020 | |

* cited by examiner

Y DIRECTION

Z DIRECTION

X DIRECTION

DISPLAY DEVICE

CROSS REFERENCE TO RELATED APPLICATIONS

This application is a U.S. National Phase of International Patent Application No. PCT/JP2021/033547 filed on Sep. 13, 2021, which claims priority benefit of Japanese Patent Application No. JP 2020-162870 filed in the Japan Patent Office on Sep. 29, 2020. Each of the above-referenced applications is hereby incorporated herein by reference in its entirety.

TECHNICAL FIELD

The present disclosure relates to a display device, and more specifically relates to a display device suitable for use in a head mounted display (HMD).

BACKGROUND ART

In recent years, an augmented reality (AR) technology that synthesizes and presents a virtual object or various types of information as electronic information in a real environment (or a part thereof) as additional information has attracted attention. In order to achieve this augmented reality technology, for example, a head mounted display has been studied as a device that presents visual information. Then, as an application field, work support in a real environment is expected, and for example, provision of road guidance information, provision of technical information to a technician who performs maintenance, and the like can be mentioned. In particular, head mounted displays are very convenient because the hands are not blocked. Furthermore, even in a case where various types of information and the like are obtained while moving outdoors, it is possible to simultaneously capture various types of information and the like constituted by videos or images in the field of view and the external environment, and thus smooth movement is possible.

A virtual image display device (display device) for allowing an observer to observe a two-dimensional image formed by an image display device as an enlarged virtual image by a virtual image optical system is known from, for example, Japanese Patent Application Laid-Open No. 2007-094175. The display device disclosed in Japanese Patent Application Laid-Open No. 2007-094175 has a structure in which a display image light is guided inside a light guide plate on the basis of total reflection using a pair of reflective volume hologram diffraction gratings and emitted to the pupil of the observer. Furthermore, the display device disclosed in Japanese Patent Application Laid-Open No. 2011-053367 includes a reflecting portion that reflects a display image light toward the eyeball of the observer, and has a structure in which the display image can be observed without blocking the field of view of the real world by making the width of the reflecting portion in a direction perpendicular to the optical axis smaller than the pupil diameter of the human.

CITATION LIST

Patent Document

Patent Document 1: Japanese Patent Application Laid-Open No. 2007-094175

Patent Document 2: Japanese Patent Application Laid-Open No. 2011-053367

SUMMARY OF THE INVENTION

Problems to be Solved by the Invention

Incidentally, since the reflective volume hologram diffraction grating used in the display device disclosed in Japanese Patent Application Laid-Open No. 2007-094175 has high wavelength dependency of diffraction efficiency and cannot achieve high diffraction efficiency, it is necessary to use a bright light source in order to obtain a bright image, and the entire display device including the light source and a drive circuit thereof becomes large. In the display device disclosed in Japanese Patent Application Laid-Open No. 2011-053367, it is necessary to keep the positional relationship among an image emission unit including a display element that displays a two-dimensional image, the reflecting portion, and the eyeball of the observer constant. Thus, the display image light can easily become invisible due to a change in the positional relationship between the image emission unit attached to the frame portion of the spectacles and the pupil of the observer, which may occur during wearing of the display device. In addition, there is a disadvantage that a sufficient wide angle of view cannot be obtained because there is a restriction on the diameter of the reflecting portion that substantially functions as an aperture diaphragm.

Therefore, an object of the present disclosure is to provide a display device that is small and lightweight, can cope with a change in a positional relationship between an image display device and a pupil of an observer, and can obtain a sufficiently wide angle of view.

Solutions to Problems

A display device according to a first aspect of the present disclosure for achieving the above object includes:

an image display device;

a plate-shaped transparent member; and a light reflecting portion, in which the transparent member includes a first surface facing an observer who observes an image, a light incident surface on which light emitted from the image display device is incident, and a second surface that faces the first surface and totally reflects the light incident from the light incident surface, the first surface includes a first portion and a second portion, the second portion is located in a region close to the light incident surface, the first portion extends from the second portion and is located in a region far from the light incident surface, the light reflecting portion is provided inside the transparent member corresponding to the first portion of the first surface of the transparent member or in the first portion of the first surface of the transparent member, a part of the light emitted from the image display device is incident from the light incident surface, totally reflected by the second surface, further reflected by the light reflecting portion, emitted from the first portion of the first surface, and reaches a pupil of the observer, and another part of the light emitted from the image display device is incident from the light incident surface, collides with the second portion of the first surface, and does not reach the pupil of the observer.

A display device according to a second aspect or a third aspect of the present disclosure for achieving the above object includes:

an image display device;

a plate-shaped transparent member; and a light reflecting portion, in which the transparent member includes a first surface facing an observer who observes an image, a light incident surface on which light emitted from the image display device is incident, and a second surface that faces the first surface and totally reflects light incident from the light incident surface, the light reflecting portion is provided inside the transparent member or on the first surface of the transparent member, the light emitted from the image display device is incident from the light incident surface, totally reflected by the second surface, further reflected by the light reflecting portion, emitted from the first surface, and reaches a pupil of the observer, and the light reflecting portion includes a plurality of light reflecting segments.

Then, in the display device according to the second aspect of the present disclosure, when a size of the light reflecting segment that is provided in a region close to the light incident surface is assumed as $S_N$, and a size of the light reflecting segment that is provided in a region far from the light incident surface is assumed as $S_F$, $$S_N < S_F$$

is satisfied.

Furthermore, in a display device according to the third aspect of the present disclosure, a portion where a light beam emitted from a center of the image display device and perpendicularly incident on the pupil of the observer is emitted from the transparent member is referred to as a center of the transparent member, an orthogonal projection image of a trace of a light beam emitted from the center of the image display device in the transparent member on the second surface is assumed as an X axis, a normal line of the second surface passing through the center of the transparent member is assumed as a Z axis, and an axis orthogonal to the X axis and the Z axis is assumed as a Y axis, when an arrangement pitch along a Y direction parallel to the Y axis of the light reflecting segment that is provided in the region close to the light incident surface is assumed as $P_{N-Y}$, and an arrangement pitch along the Y direction parallel to the Y axis of the light reflecting segment that is provided in the region far from the light incident surface is assumed as $P_{F-Y}$, $$P_{N-Y} > P_{F-Y}$$

is satisfied.

MODE FOR CARRYING OUT THE INVENTION

Figure 1A:
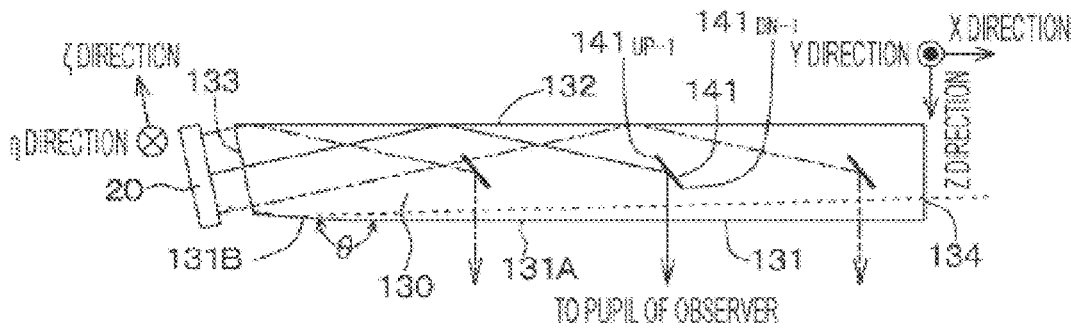
FIGS. 1A and 1B are a schematic cross-sectional view when a transparent member and an image display device in a display device of a first embodiment are cut in an XZ virtual plane, and a schematic view when the transparent member and the image display device in the display device of the first embodiment are viewed from an observer side, respectively.

Hereinafter, the present disclosure will be described on the basis of embodiments with reference to the drawings, but the present disclosure is not limited to the examples, and various numerical values and materials in the examples are examples. Note that the description will be made in the following order.

1. General description of display devices according to first to third aspects of the present disclosure
2. First embodiment (display device according to first aspect of present disclosure)
3. Second embodiment (modification of first embodiment)
4. Third embodiment (another modification of first embodiment)
5. Fourth embodiment (display device according to second and third aspects of present disclosure)
6. Fifth embodiment (modification of first to fourth embodiments)
7. Others General Description of Display Devices According to First to Third Aspects of the Present Disclosure In a display device according to a second aspect of the present disclosure, a configuration can be employed in which a portion where a light beam emitted from a center of the image display device and perpendicularly incident on the pupil of the observer is emitted from the transparent member is referred to as a center of the transparent member, an orthogonal projection image of a trace of a light beam emitted from the center of the image display device in the transparent member on the second surface is assumed as an X axis, a normal line of the second surface passing through the center of the transparent member is assumed as a Z axis, and an axis orthogonal to the X axis and the Z axis is assumed as a Y axis, when an arrangement pitch along a Y direction parallel to the Y axis of the light reflecting segment that is provided in the region close to the light incident surface is assumed as $P_{N\text{-}Y}$, and an arrangement pitch along the Y direction parallel to the Y axis of the light reflecting segment that is provided in the region far from the light incident surface is assumed as $P_{F\text{-}Y}$, $$P_{N\text{-}Y} > P_{F\text{-}Y}$$

is satisfied.

In the display device according to a first aspect of the present disclosure, a mode can be employed in which the light reflecting portion includes a plurality of light reflecting segments. Then, in this case, a mode can be employed in which:

a portion where a light beam emitted from a center of the image display device and perpendicularly incident on the pupil of the observer is emitted from the transparent member is referred to as a center of the transparent member, an orthogonal projection image of a trace of a light beam emitted from the center of the image display device in the transparent member on the second surface is assumed as an X axis, a normal line of the second surface passing through the center of the transparent member is assumed as a Z axis, and an axis orthogonal to the X axis and the Z axis is assumed as a Y axis, when an arrangement pitch along a Y direction parallel to the Y axis of the light reflecting segment that is provided in the region close to the light incident surface is assumed as $P_{N\text{-}Y}$, and an arrangement pitch along the Y direction parallel to the Y axis of the light reflecting segment that is provided in the region far from the light incident surface is assumed as $P_{F\text{-}Y}$, $$P_{N\text{-}Y} > P_{F\text{-}Y}$$

is satisfied. Furthermore, in the display device of these modes, a mode can be employed in which, when a size of the light reflecting segment that is provided in the region close to the light incident surface is assumed as $S_N$, and a size of the light reflecting segment that is provided in the region far from the light incident surface is assumed as $S_F$, $$S_N < S_F$$

is satisfied. Here, the display device having the various modes described above may be referred to as a "display device of the first mode of the present disclosure" for convenience.

In the display device of the first mode of the present disclosure and in the display devices according to the second to third aspects of the present disclosure including the preferable configurations described above, a mode can be employed in which the light reflecting segments are inclined from a first end portion (for example, an upper end portion) far from the observer and close to the second surface and close to the light incident surface toward a second end portion (for example, a lower end portion) close to the observer and close to the first surface and far from the light incident surface. Then, it can be said that the sizes of the light reflecting segments change (specifically, increase) along an inclination direction (in an inclination direction from the first end portion toward the second end portion), and it can be said that the arrangement pitches of the light reflecting segments in a direction orthogonal to the inclination direction change (specifically, decrease) along the inclination direction.

Alternatively, in the display device of the first mode of the present disclosure, a mode can be employed in which a reflecting surface is disposed at an end portion of the transparent member facing the light incident surface or near the end portion, and a part of the light emitted from the image display device is incident from the light incident surface, totally reflected by the second surface, reflected by the reflecting surface, further reflected by the light reflecting portion, emitted from the first portion (in the display devices according to the second to third aspects of the present disclosure, the first surface) of the first surface, and reaches the pupil of the observer. Then, in this case, in the display device according to the second and third aspects of the present disclosure including the preferable configuration described above, a mode can be employed in which the light reflecting segments are inclined from the first end portion (for example, the upper end portion) close to the observer and close to the first surface and close to the light incident surface toward the second end portion (for example, the lower end portion) away from the observer and close to the second surface and far from the light incident surface. Then, it can be said that the sizes of the light reflecting segments change (specifically, increase) along an inclination direction (in the inclination direction from the first end portion toward the second end portion), and it can be said that the arrangement pitches of the light reflecting segments in the direction orthogonal to the inclination direction change (specifically, decrease) along the inclination direction.

Specifically, the reflecting surface can include, for example, a concave surface portion. The concave surface portion can be obtained, for example, by forming a light reflecting film on a base (having a convex shape in a case where an end portion of the transparent member is viewed from the light incident surface of the transparent member) for forming the concave surface portion at the end portion of the transparent member. The concave surface portion has what is called a cylindrical concave mirror shape. That is, a cross-sectional shape when the concave surface portion is cut along an XZ virtual plane and a YZ virtual plane is "concave" (for example, a part of a circle, a part of a parabola, a part of a sine curve, a part of an ellipse, a part of a catenary curve, and the like). However, the radius of curvature in the cross-sectional shape when the concave surface portion is cut along the XZ virtual plane (the radius of the circle in contact with a central portion of the cross-section when cut along the XZ virtual plane) and the radius of curvature in the cross-sectional shape when the concave surface portion is cut along the YZ virtual plane (the radius of the circle in contact with a central portion of the cross-section when cut along the YZ virtual plane) are different. The light incident on the concave surface portion is reflected by the concave surface portion and is emitted from the concave surface portion, and at this time, it is desirable that the light is emitted as substantially (approximately) parallel light, so that the light emitted from the light reflecting portion can have a predetermined parallelism.

In the display device of the first mode of the present disclosure including the preferable mode described above, and in the display devices according to the second to third aspects of the present disclosure including the preferable configuration and mode described above, a mode can be employed in which the light reflecting segments each include a light reflecting layer including a metal reflecting film, an alloy reflecting film, or a dielectric multilayer film. Alternatively, a mode can be employed in which the light reflecting segments each have a stacked structure of a light reflecting layer and a light absorbing layer. The light absorbing layer absorbs light colliding with the light reflecting segment and suppresses unnecessary reflection as much as possible. As described above, in a case where the light reflecting segments have the stacked structure of the light reflecting layer and the light absorbing layer, in a case where light emitted from the image display device collides with the light absorbing layer for some reason, the light is absorbed, unnecessary reflection can be suppressed as much as possible, and there is no possibility that an image is observed from the outside.

Moreover, in the display device according to the first aspect of the present disclosure including the display device of the first mode of the present disclosure including the preferable mode described above, and in the display devices according to the second to third aspects of the present disclosure including the preferable configurations and modes described above, a mode can be employed in which a light transmission ratio of external light in a Z direction of a portion of the transparent member including the light reflecting portion is 0.7 or more. That is, it is preferable to dispose the light reflecting segments such that the light transmission ratio of the external light is 0.7 or more. More specifically, it is preferable to dispose the light reflecting segments such that the light transmission ratio of the external light in any region having a diameter of 5 mm is 0.7 or more.

Moreover, in the display device according to the first aspect of the present disclosure including the display device of the first mode of the present disclosure including the preferable mode described above, and in the display devices according to the second to third aspects of the present disclosure including the preferable configurations and modes described above, a mode can be employed in which a light absorbing film is formed on an outer surface of the second surface, and thereby a sunglasses type display device can be obtained. The light absorbing film reduces the amount of external light incident on the transparent member from the second surface to an appropriate amount of light.

Alternatively, a dimming device may be disposed on the outer surface of the second surface, and an antireflecting film including an ultraviolet absorbing layer, a contamination preventing layer, a hard coat layer, an antistatic layer, or a fluorine-based resin may be formed, or a protective member (for example, cover glass) may be disposed on the outer surface of the second surface.

Moreover, in the display device according to the first aspect of the present disclosure including the display device of the first mode of the present disclosure including the preferable mode described above, and in the display devices according to the second to third aspects of the present disclosure including the preferable configurations and modes described above, a mode can be employed in which the image display device has a plurality of pixels arranged in a two-dimensional matrix in a $\zeta$ direction corresponding to an X direction and an $\eta$ direction corresponding to the Y direction. Such a configuration of the image display device is referred to as an "image display device of a first configuration" for convenience. Alternatively, a mode can be employed in which the image display device includes a light source and a scanning means that scans light emitted from the light source to form an image. Such an image display device is referred to as an "image display device of a second configuration" for convenience.

Moreover, in the display device according to the first aspect of the present disclosure including the display device of the first mode of the present disclosure including the preferable mode described above, and in the display devices according to the second to third aspects of the present disclosure including the preferable configurations and modes described above, a mode can be employed in which the image display device is located above or below the transparent member with respect to the observer, and a mode can be employed in which the image display device is located closer to the ear side of the observer than the transparent member.

In the display device according to the first aspect of the present disclosure, another part (unnecessary light) of the light emitted from the image display device is incident from the light incident surface, collides with the second portion of the first surface, and does not reach the pupil of the observer, and specifically, a mode can be mentioned in which (A) another part of the light emitted from the image display device is incident from the light incident surface, collides with the second portion of the first surface, totally reflected by the second portion, and emitted out of the system from an end surface of the transparent member facing the light incident surface without colliding with the light reflecting segments or without colliding with the second surface and the light reflecting segments. In this case, the second portion is preferably inclined with respect to the first portion. Note that the angle θ formed by a surface of the second portion and a surface of the first portion exceeds 180 degrees.

Alternatively, a mode can be mentioned in which (B) another part of the light emitted from the image display device is incident from the light incident surface, collides with the second portion of the first surface, is reflected by the second portion, and is emitted out of the system from the second surface, for example, without colliding with the light reflecting segments. In this case, the second portion is inclined with respect to the first portion, and for example, a light reflecting film is preferably formed. Note that the angle θ formed by the surface of the second portion and the surface of the first portion exceeds 180 degrees or is less than 180 degrees. Alternatively, a mode can be mentioned in which (C) another part of the light emitted from the image display device is absorbed by a light absorbing material layer formed in the second portion of the first surface.

Alternatively, a mode can be mentioned in which (D) another part of the light emitted from the image display device is emitted out of the system via a multilayer film formed on the second portion of the first surface. Alternatively, a mode can be mentioned in which (E) an uneven portion (fine uneven portion) is provided in the second portion of the first surface. Then, in this case, for example, (E-1) preferably, a structure is employed in which, when the uneven portion provided in the second portion of the first surface is cut along the XZ virtual plane, light that has collided with an inclined surface (referred to as a "first inclined surface of the uneven portion" for convenience) that is an inclined surface of the uneven portion and faces the light incident surface is reflected by the first inclined surface (for example, a light reflecting film is formed) of the uneven portion and is emitted out of the system, or light that has collided with an inclined surface (referred to as a "second inclined surface of the uneven portion" for convenience) that is an inclined surface of the uneven portion and is not the first inclined surface of the uneven portion is totally reflected by the second inclined surface of the uneven portion and is emitted out of the system from an end surface of the transparent member facing the light incident surface without colliding with the light reflecting segments or without colliding with the second surface and the light reflecting segments, or (E-2) preferably, a structure is employed in which, the light reflected by the first inclined surface (for example, a light reflecting film is formed) of the uneven portion, emitted out of the system, and colliding with the second inclined surface (for example, a light reflecting film is formed) of the uneven portion is reflected by the second inclined surface of the uneven portion, and is emitted out of the system from the second surface, for example, without colliding with the light reflecting segments.

Note that the structures (A) to (E) described above can be appropriately combined.

The display device according to the first aspect of the present disclosure including the display device of the first mode of the present disclosure including the preferable mode described above, and the display devices according to the second to third aspects of the present disclosure including the preferable configurations and modes described above (hereinafter, these display devices may be collectively referred to as "display device and the like of the present disclosure" for convenience) can employ a mode in which a frame to be worn on the head of the observer is further provided, and the transparent member including the image display device and the light reflecting portion is attached to the frame. Note that, hereinafter, the transparent member including the light reflecting portion may be referred to as a "transparent member or the like" for convenience.

In the display device and the like of the present disclosure, the entire transparent member or the like is a semi-transmissive type (see-through type), and an outside view can be viewed through the transparent member or the like.

Specifically, as described above, the light transmission ratio of the external light in the Z direction in a portion of the transparent member or the like is preferably 0.7 or more. That is, in the portion of the transparent member or the like, it is preferable that 70% or more of the external light (light) incident from the Z direction via the second surface passes through the portion of the transparent member or the like and is emitted from the first surface.

The image display device in the display device and the like of the present disclosure can perform image display of a single color (for example, green or blue) or color image display.

Examples of the image display device of the first configuration include: an image display device including a reflective type spatial light modulation device and a light source; an image display device including a transmissive type spatial light modulation device and a light source; and an image display device including a plurality of light emitting elements such as organic electro luminescence (EL) light emitting elements, inorganic EL light emitting elements, light emitting diodes (LED), and semiconductor laser elements, and among them, an image display device including a plurality of organic EL light emitting elements (organic EL display device), an image display device including a plurality of light emitting diodes, a reflective spatial light modulation device, and an image display device including a light source are preferable. As the spatial light modulation device, a transmissive type or reflective type liquid crystal display device of a light valve, for example, a liquid crystal on silicon (LCOS) or the like, and a digital micromirror device (DMD) can be mentioned, and a light emitting element can be mentioned as the light source. Moreover, a configuration can be employed in which the reflective type spatial light modulation device includes a liquid crystal display device and a polarizing beam splitter that reflects a part of light from a light source and guides the light to the liquid crystal display device, and passes a part of light reflected by the liquid crystal display device and guides the light to a transparent member. As the light emitting element constituting the light source, a red light emitting element, a green light emitting element, a blue light emitting element, and a white light emitting element can be mentioned. Alternatively, the white light may be obtained by mixing red light, green light, and blue light emitted from the red light emitting element, the green light emitting element, and the blue light emitting element using a light pipe and uniformizing luminance. As the light emitting element, for example, a semiconductor laser element, a solid-state laser, and an LED can be exemplified. The number of pixels is only required to be determined on the basis of specifications required for the image display device, and as specific values for the number of pixels, 320×240, 432×240, 640×480, 854×480, 1024×768, 1920×1080, or the like can be exemplified. In the image display device of the first configuration, a mode can be employed in which a diaphragm is disposed at a position of a front focal point (focal point on the image display device side) of a lens system (described later), and this diaphragm corresponds to an image emission unit from which an image is emitted from the image display device.

Furthermore, a light emitting element can be mentioned as a light source in the image display device of the second configuration, and specifically, a red light emitting element, a green light emitting element, a blue light emitting element, and a white light emitting element can be mentioned, or red light, green light, and blue light emitted from the red light emitting element, the green light emitting element, and the blue light emitting element may be mixed and subjected to uniformization of luminance with a light pipe to obtain white light. As the light emitting element, for example, a semiconductor laser element, a solid-state laser, and an LED can be exemplified. The number of pixels (virtual pixels) in the image display device of the second configuration is also only required to be determined on the basis of specifications required for the image display device, and as specific values for the number of pixels (virtual pixels), 320×240, 432×240, 640×480, 854×480, 1024×768, 1920×1080, or the like can be exemplified. Furthermore, in a case of displaying a color image and a case of forming the light source by the red light emitting element, the green light emitting element, and the blue light emitting element, it is preferable to perform color synthesis using, for example, a cross prism. As the scanning means, for example, micro electro mechanical systems (MEMS) mirror having a micromirror capable of rotating in a two-dimensional direction and a galvano mirror, which horizontally and vertically scans with a light emitted from a light source, can be mentioned. In the image display device of the second configuration, a mode can be employed in which a MEMS mirror or a galvanometer mirror is disposed at a position of a front focal point (focal point on the image display device side) of a lens system (described later), and the MEMS mirror or the galvanometer mirror corresponds to an image emission unit from which an image is emitted from the image display device.

In the display devices according to the second to third aspects of the present disclosure, the image display device preferably includes a lens system (an optical system that makes the emitted light substantially parallel light). That is, it is preferable to employ a mode in which the light emitted from the image display device is substantially parallel light in the lens system and is incident on the light incident surface. Such a request for substantially parallel light is based on the need to preserve optical wavefront information when this light is incident on the transparent member even after the light is emitted from the transparent member via the light reflecting portion. In order to generate the substantially parallel light, specifically, for example, the image emission unit of the image display device is only required to be positioned at a location (position) of a focal length in the lens system. As the lens system, an optical system having positive optical power as a whole, in which a convex lens, a concave lens, a free-form surface prism, and a hologram lens are used alone or in combination can be exemplified. A light shielding portion having an opening may be disposed between the lens system and the transparent member so that undesirable light is not emitted from the lens system and is not incident on the transparent member. The substantially parallel light incident on the transparent member is emitted from the first surface in a substantially parallel light state. Then, the displayed image converges to a finite distance, so that the observer can view the displayed image at the finite distance.

As a material constituting the transparent member, optical glass such as quartz glass and BK7, glass including soda lime glass and white plate glass, and a plastic material (for example, PMMA, polycarbonate resin, a stacked structure of polycarbonate resin and acrylic resin, acrylic resin, cyclo olefin polymer, polypropylene resin including amorphous polypropylene resin, styrene resin including an AS resin, polyethylene terephthalate, polyethylene naphthalate, cellulose ester such as cellulose acetate, a fluoropolymer such as polyvinylidene fluoride or a copolymer of polytetrafluoroethylene and hexafluoropropylene, polyether such as polyoxymethylene, polyolefin such as polyacetal, polystyrene, polyethylene, methylpentene polymer, polyimide such as polyamideimide or polyetherimide, polyamide, polyether sulfone, polyphenylene sulfide, polyvinylidene fluoride, tetraacetylcellulose, brominated phenoxy, polyarylate, polysulfone, or the like) can be mentioned.

As described above, the transparent member includes the first surface facing an observer who observes an image, the light incident surface on which light emitted from the image display device is incident, the second surface that faces the first surface and totally reflects light incident from the light incident surface, and an end surface of the transparent member facing the light incident surface, and further includes a third surface and a fourth surface. The third surface is surrounded by the first surface, the light incident surface, the second surface, and one end of the end surface, and the fourth surface is surrounded by the first surface, the light incident surface, the second surface, and the other end of the end surface.

The shape of the transparent member is not limited to a flat plate, and may have a curved shape.

The light reflecting segments are each formed on a flat base (constituted by a part of the transparent member). As a planar shape of the light reflecting segments, a circle, an ellipse (for example, an ellipse such that a figure when orthogonally projected onto the second surface is circular), and a smooth closed curve can be mentioned but the planar shape but is not limited thereto, and a polygon (including a polygon with rounded vertices) such as a square, a quadrangle including a rectangle, a triangle including an equilateral triangle, a hexagon including a regular hexagon, and an octagon including a regular octagon can be mentioned. The light reflecting segments may be randomly arranged in the X direction and the Y direction, or may be arranged in the Y direction but not in the X direction, and the arrangement state of the light reflecting segments may be essentially arbitrary. In the display device according to the first aspect of the present disclosure, positive optical power may be given to the light reflecting segments, and specifically, the light reflecting segments is only required to have a concave shape. Then, the light emitted from the light reflecting portion can thereby have a predetermined parallelism. The sizes $S_N$ and $S_F$ of the light reflecting segments may be, but are not limited to, 0.3 mm to 1.5 mm for example, and the arrangement pitches $P_{N-Y}$ and $P_{F-Y}$ of the light reflecting segments along the Y direction parallel to the Y axis may be, but are not limited to, 0.5 mm to 2.5 mm for example. The arrangement pitches of the light reflecting segments along the X direction can be, for example, constant, but is not limited thereto. The plurality of light reflecting segments constituting the light reflecting portion preferably has substantially the same specifications (optical characteristics) except for the sizes and the arrangement pitches. That is, the inclination angles and the light reflectances of the light reflecting segments are preferably the same. If there is a difference in the inclination angles of the light reflecting segments, the image observed by the observer becomes double or multiple, and if there is a difference in the light reflectances of the light reflecting segments, the brightness of the image observed by the observer becomes non-uniform.

As the materials constituting the metal reflecting film, the alloy reflecting film, the light reflecting layer, and the light reflecting film, aluminum, an aluminum alloy (for example, Al—Nd or Al—Cu), an Al/Ti stacked structure, an Al—Cu/Ti stacked structure, chromium (Cr), silver (Ag), silver alloys (for example, Ag—Cu, Ag—Pd—Cu, Ag—Sm—Cu), copper, copper alloys, gold, and gold alloys can be mentioned. In addition, as the dielectric materials constituting the dielectric multilayer film and the light reflecting film, for example, oxides such as Si, Mg, Al, Hf, Nb, Zr, Sc, Ta, Ga, Zn, Y, B, and Ti, nitrides (for example, $SiN_X$, $AlN_X$, $AlGaN_X$, $GaN_X$, $BN_X$, and the like), or fluorides can be mentioned. Specifically, $SiO_X$, $TiO_X$, $NbO_X$, $ZrO_X$, $TaO_X$, $ZnO_X$, $AlO_X$, $HfO_X$, $SiN_X$, $AlN_X$, and the like can be exemplified. Then, by alternately stacking two or more kinds of dielectric films including dielectric materials having different refractive indexes among these dielectric materials, a light reflecting layer or a light reflecting film can be obtained. For example, a multilayer film such as $SiO_X/SiN_Y$, $SiO_X/TaO_Y$, $SiO_X/NbO_Y$, $SiO_X/ZrO_Y$, or $SiO_X/AlN_Y$ is preferable. In order to obtain a desired light reflectance, it is only required to appropriately select a material constituting each dielectric film, a film thickness, the number of stacked layers, and the like. The thickness of each dielectric film can be appropriately adjusted according to the material to be used or the like. The light absorbing layer and the light absorbing material layer include, for example, a black resin film (specifically, for example, a black polyimide-based resin) mixed with a black colorant and having an optical density of 1 or more, or include a thin film filter using interference of a thin film. The thin film filter is formed by stacking two or more thin films including metal, metal nitride, or metal oxide, for example, and attenuates light using interference of the thin films. As the thin film filter, specifically, include a thin film filter in which Cr and chromium (III) oxide ($Cr_2O_3$) are alternately stacked can be mentioned. In the light reflecting layer, in some cases, the light reflecting segment may have a half mirror (semi-transmissive mirror) structure or a polarizing beam splitter (PBS) structure.

The metal reflecting film, the alloy reflecting film, the light reflecting layer, and the light reflecting film can be formed (deposited) on the basis of a known method, and specifically, examples of the method include: PVD methods such as vacuum vapor deposition method, sputtering method, reactive sputtering method, ECR plasma sputtering method, magnetron sputtering method, ion beam assisted vapor deposition method, ion plating method, and laser ablation method; various CVD methods; application methods such as spray method, spin coating method, and dipping method; methods of combining two or more of these methods; methods of combining these methods with any one or more of whole or partial pretreatments, irradiation of inert gas (Ar, He, Xe, or the like) or plasma, irradiation of oxygen gas, ozone gas, or plasma, oxidation treatment (heat treatment), and exposure treatment. Then, after the formation (deposition), for example, patterning is only required to be performed on the basis of an etching method. Alternatively, at the time of formation (deposition), for example, a desired shape can be obtained by using an appropriate mask member. Furthermore, broadly, the light reflecting segments can be formed by the method described above.

The display device may include one image display device (single-eye type) or two image display devices (binocular type).

In the display device and the like of the present disclosure, a mode can be employed in which the frame includes a front portion disposed in front of the observer, two temple portions rotatably attached to both ends of the front portion via hinges, and a nose pad portion. A temple tip (front cell portion) is attached to a tip portion of each temple portion as necessary. Furthermore, a configuration can be employed in which the front portion and the two temple portions are integrated. The frame can have a known configuration and structure. The material constituting the frame including the nose pad portion can be formed by the same material as the material forming ordinary eyeglasses or sunglasses, such as metal, alloy, plastic, or a combination thereof. That is, when the entire display device and the like of the present disclosure is viewed, an assembly of the frame (including a rim portion) and the nose pad portion has substantially the same structure as that of normal glasses or sunglasses. A speaker or a headphone part may be attached to the temple portion, or an imaging device may be attached to the front portion.

A mode can be employed in which the transparent member is attached to the front portion. Specifically, a mode can be employed in which the front portion has a rim portion, and the transparent member is fitted into the rim portion. The image display device is attached to the frame, and specifically, for example, the image display device is only required to be attached to the front portion, or is only required to be attached to the temple portion.

Furthermore, in the display device and the like of the present disclosure, from the viewpoint of design or ease of mounting, it is desirable to employ a mode in which wirings (signal lines, power lines, or the like) from one or two image display devices extend from a tip portion of the temple tip to the outside via the temple portion and the inside of the temple tip and are connected to a control device (control circuit or control means). Moreover, a mode can be employed in which each image display device includes a headphone part, and a wiring for the headphone part from each image display device extends from the tip portion of the temple tip to the headphone part via the temple portion and the inside of the temple tip. As the headphone part, for example, an inner ear type headphone part and a canal type headphone part can be mentioned. More specifically, it is preferable to employ a mode in which the wiring for the headphone part extends from the tip portion of the temple tip to the headphone part so as to wrap around a back side of a pinna (auricle). Furthermore, a mode can be employed in which a camera (imaging device) is attached to a center portion of the front portion. Specifically, the camera includes, for example, a solid-state image sensor including a CCD or CMOS sensor and a lens. The wiring from the camera is only required to be connected to one image display device via the front portion, for example, and is only required to be included in the wiring extending from the image display device.

In the display device and the like of the present disclosure, a mode can be employed in which a signal for displaying an image in the image display device is received from the outside. In such a mode, information and data related to an image to be displayed on the image display device are recorded, stored, and saved in, for example, what is called a cloud computer or a server, and various kinds of information and data can be exchanged between the cloud computer or the server and the display device by providing the display device with a communication means such as a mobile phone or a smartphone, or by combining the display device and the communication means, and a signal based on various kinds of information and data, that is, a signal for displaying an image on the image display device can be received. Alternatively, a mode can be employed in which a signal for displaying an image in the image display device is stored in the display device. The image displayed on the image display device includes various types of information and various types of data. Alternatively, the display device may include a camera (imaging device), send an image captured by the camera to the cloud computer or the server via the communication means, search for various types of information and data corresponding to the image captured by the camera in the cloud computer or the server, send the found various types of information and data to the display device via the communication means, and display the found various types of information and data on the image display device.

The display device and the like of the present disclosure including the various modifications described above, for example, can be used for: reception and display of electronic mails, display of various types of information and the like at various sites on the Internet, various descriptions in operation, manipulation, maintenance, disassembly, and the like of observation targets such as various devices, and display of symbols, signs, marks, emblems, designs, and the like; display of various descriptions related to an observation target such as a person or an article, and symbols, signs, marks, emblems, designs, and the like; display of moving image and still image; display of subtitles of a movie or the like; display of descriptions related to video synchronous to video and closed caption; and display of various descriptions related to an observation target in a play, a kabuki, a noh, a Kyogen, an opera, a concert, a ballet, various plays, a pleasure ground (amusement park), a museum, a sightseeing spot, a resort, a tourist guide, and the like, and explanatory texts for describing the contents, the progress status, the background, and the like thereof, and can be used for display of closed captions. In a play, a kabuki, a noh, a kyogen, an opera, a concert, a ballet, various plays, a pleasure ground (amusement park), a museum, a sightseeing spot, a resort, a tourist guide, and the like, it is only required to display characters as an image related to the observation target on the display device at an appropriate timing. Specifically, for example, according to the progress status of a movie or the like, or according to the progress status of a play or the like, on the basis of a predetermined schedule and time allocation, an image control signal is sent to the display device by an operation of an operator or under the control of a computer or the like, and the image is displayed on the display device. Furthermore, various descriptions regarding the observation target such as various devices, persons, or articles are displayed, but by imaging (image capturing) the observation target such as various devices, persons, or articles with a camera and analyzing imaged (image-captured) contents in the display device, various descriptions regarding the observation target such as various devices, persons, or articles created in advance can be displayed on the display device.

The image signal to the image display device can include not only an image signal (for example, character data) but also, for example, luminance data (luminance information) related to an image to be displayed, or chromaticity data (chromaticity information), or luminance data and chromaticity data. The luminance data can be luminance data corresponding to luminance of a predetermined region including the observation target viewed through the transparent member or the like, and the chromaticity data can be chromaticity data corresponding to chromaticity of the predetermined region including the observation target viewed through the transparent member or the like. In this manner, the luminance (brightness) of the displayed image can be controlled by including the luminance data related to the image, the chromaticity (color) of the displayed image can be controlled by including the chromaticity data related to the image, and the luminance (brightness) and the chromaticity (color) of the displayed image can be controlled by including the luminance data and the chromaticity data related to the image. In a case of the luminance data corresponding to the luminance of the predetermined region including the observation target viewed through the transparent member or the like, it is only required to set the value of the luminance data such that the value of the luminance of the image increases as the value of the luminance of the predetermined region including the observation target viewed through the transparent member or the like increases (that is, the image is displayed brighter). Furthermore, in a case of the chromaticity data corresponding to the chromaticity of the predetermined region including the observation target viewed through the transparent member or the like, it is only required to set the value of the chromaticity data such that the chromaticity of the predetermined region including the observation target viewed through the transparent member or the like and the chromaticity of the image to be displayed have an approximately complementary color relationship. The complementary color refers to a combination of colors in a relationship positioned diametrically opposite in the color circle. It is also a complementary color such as green for red, purple for yellow, and orange for blue. It is also referred to about a color that causes a decrease in saturation by mixing a certain color with another color at an appropriate ratio, such as white in a case of light and black in a case of an object, but complementarity of a visual effect when in parallel and complementarity when mixed are different. The color is also referred to as a side color, a contrast color, and an opposite color. However, the opposite color directly indicates the color to which the complementary color is opposed, whereas the range indicated by the complementary color is slightly wide. A combination of colors of complementary colors has a synergistic effect of attracting each other's colors, and this is called complementary color harmony. Various data regarding the observation target can be obtained by, for example, a camera.

With the display device and the like of the present disclosure, for example, a head mounted display (HMD) can be formed. Then, the weight and size of the display device can thus be reduced, discomfort when the display device is attached can be significantly reduced, and manufacturing cost can also be reduced. Alternatively, the display device and the like of the present disclosure can be applied to a head-up display (HUD) provided in a vehicle, an aircraft cockpit, or the like. Specifically, the present invention can be applied to an HUD in which an image based on light emitted from the image display device is formed and which is disposed on the windshield of a vehicle, an aircraft cockpit, or the like, or can be applied to a combiner in which an image based on light emitted from the image display device is formed and which is disposed on the windshield of a vehicle, an aircraft cockpit, or the like. The display device and the like of the present disclosure can also be used as a stereoscopic display device. In this case, stereoscopic vision based on parallax in binocular vision is possible, or if necessary, it is only required that a polarizing plate or a polarizing film is detachably attached to the transparent member, or the polarizing plate or the polarizing film is attached to the transparent member.

First Embodiment

Figure 1B:
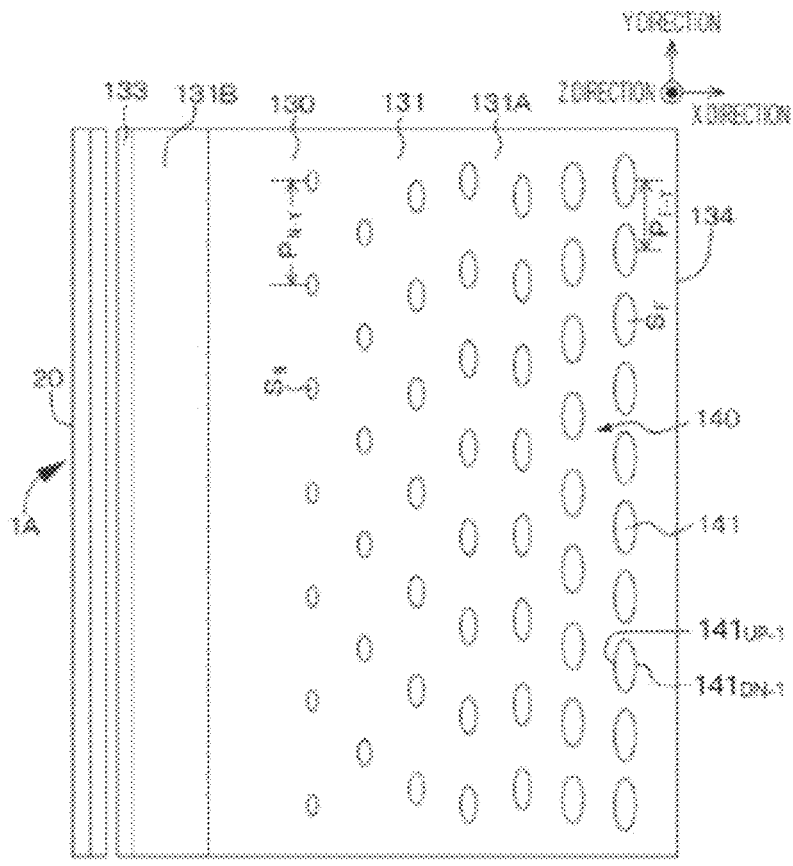
Figure 2:
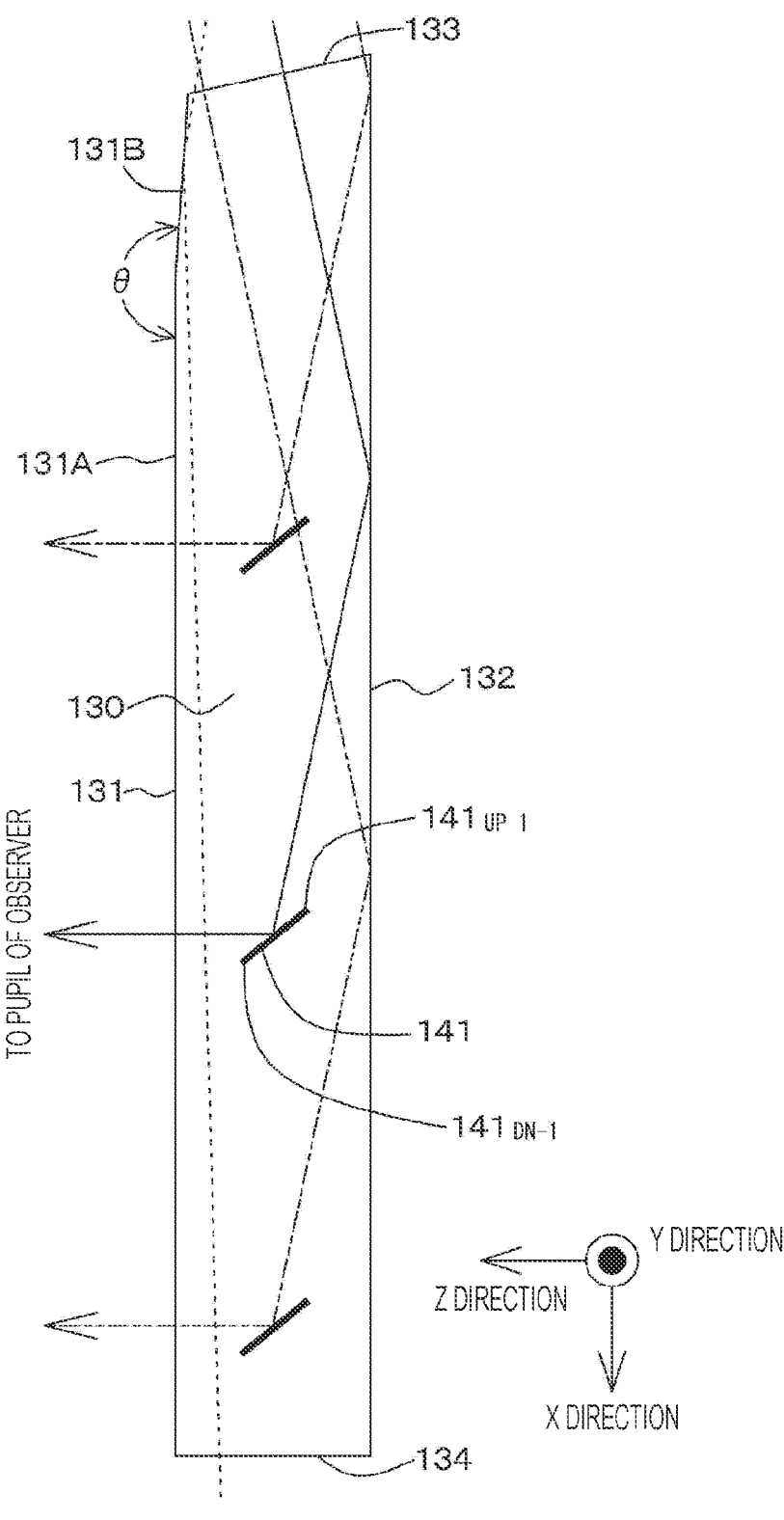
FIG. 2 is an enlarged view of FIG. 1A which is a schematic cross-sectional view when the transparent member in the display device of the first embodiment is cut along the XZ virtual plane.
Figure 3A:
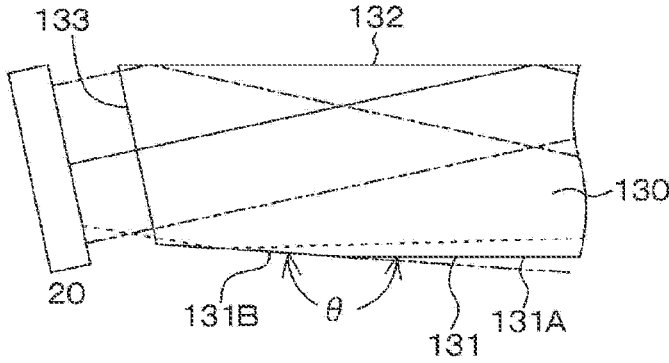
FIGS. 3A, 3B, and 3C are schematic views in which a boundary region between a first portion and a second portion of a first surface of the transparent member in a modification of the display device of the first embodiment is enlarged in the XZ virtual plane.
Figure 5:
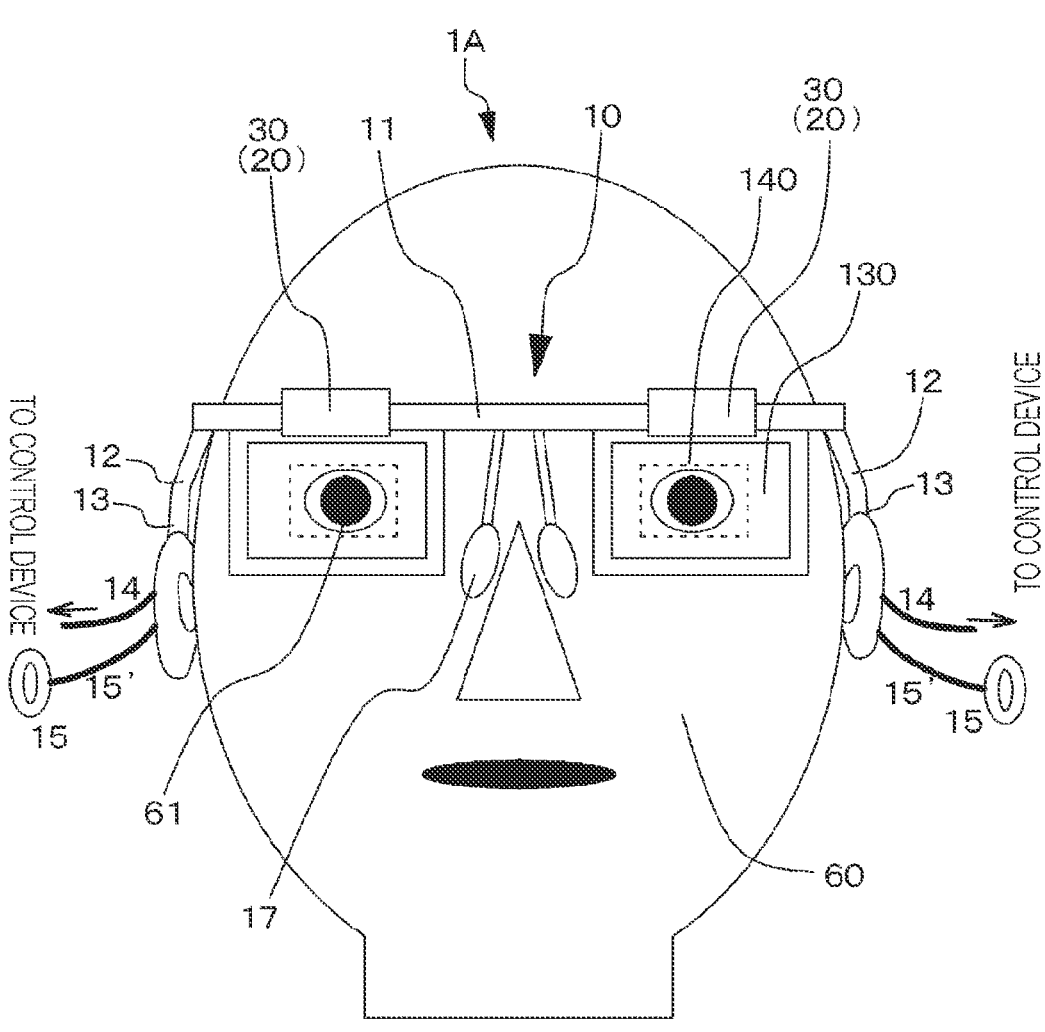
FIG. 5 is a schematic view of a display device of the first embodiment as viewed from front.
Figure 6:
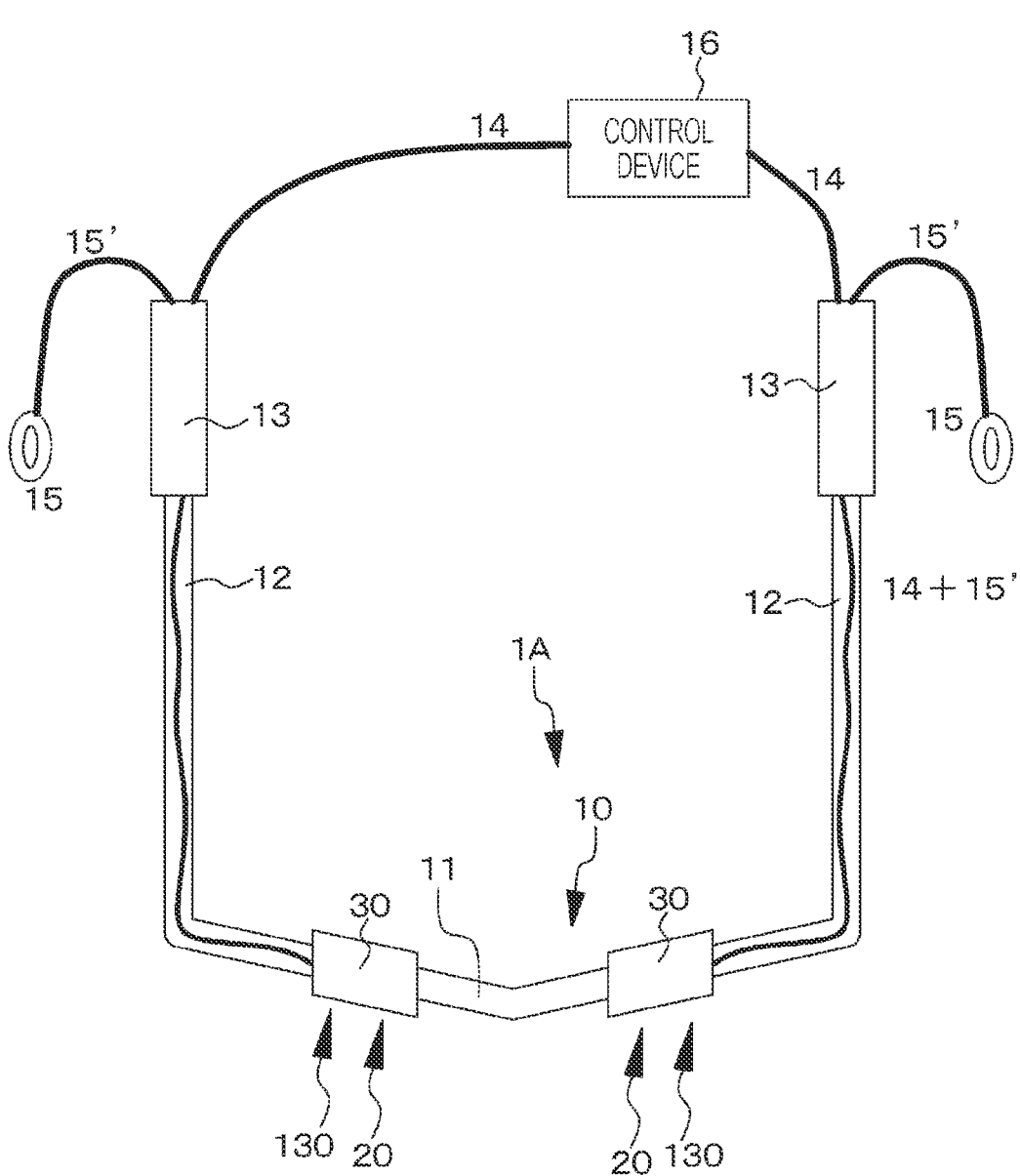
FIG. 6 is a schematic view of the display device of the first embodiment as viewed from above.
Figure 7:
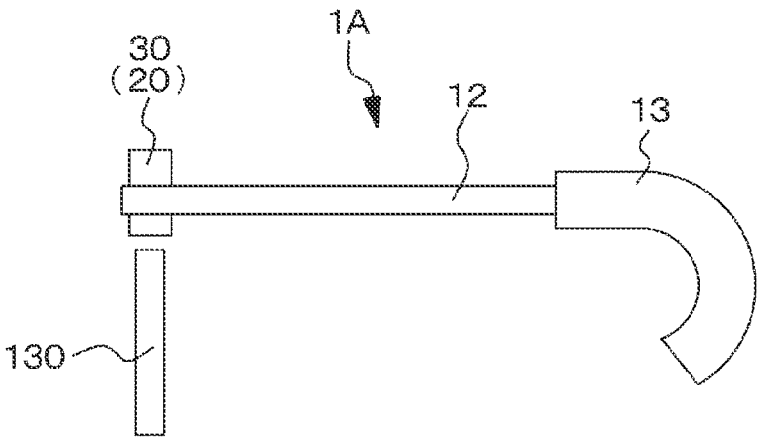
FIG. 7 is a schematic view of a part of the display device when the display device of the first embodiment is viewed from a side.
Figure 8:
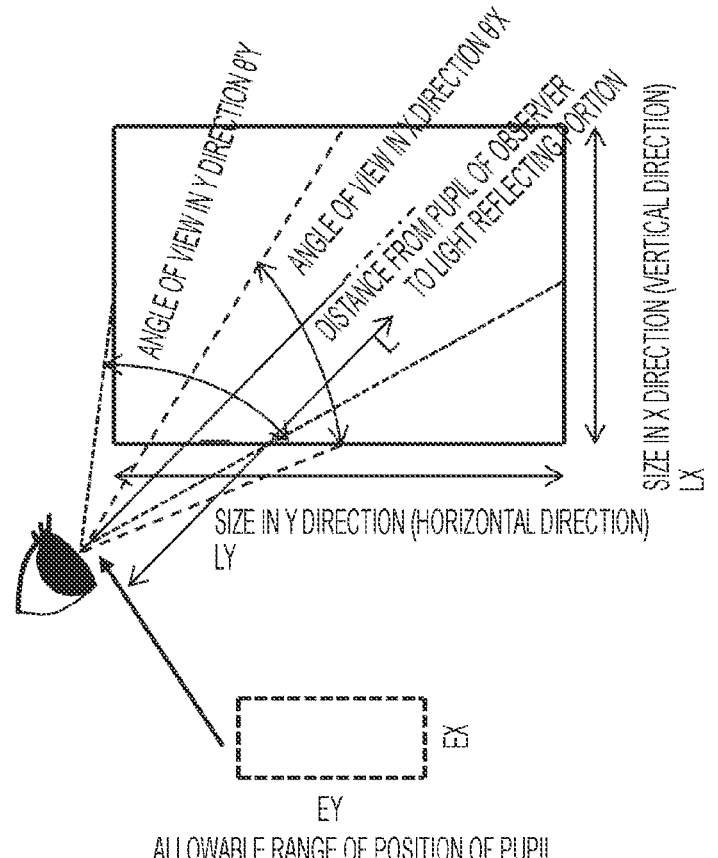
FIG. 8 is a schematic diagram for describing a size of a light reflecting portion.

A first embodiment relates to a display device according to the first aspect of the present disclosure. A schematic cross-sectional view of the transparent member and the image display device in the display device of the first embodiment taken along the XZ virtual plane is illustrated in FIG. 1A, and an enlarged view of a part of FIG. 1A is illustrated in 2. Furthermore, a schematic view of the transparent member and the image display device in the display device of the first embodiment as viewed from the observer side is illustrated in FIG. 1B, a schematic view of the display device of the first embodiment as viewed from the front is illustrated in FIG. 5, a schematic view of the display device as viewed from above is illustrated in FIG. 6, and a schematic view of a part of the display device as viewed from the side is illustrated in FIG. 7. A schematic diagram for describing the size of the light reflecting portions is illustrated in FIG. 8. Furthermore, an enlarged schematic view of a boundary region between the first portion and the second portion of the first surface of the transparent member is illustrated in FIG. 3A. Three light reflecting segments are illustrated in FIG. 1A and a part of a plurality of light reflecting segments is illustrated in FIG. 1B, but in practice, a large number of light reflecting segments are provided. The same applies to FIGS. 2, 9, 10, 13, 15, 16, and 20. Furthermore, FIGS. 1A, 2, 3A, 3B, 3C, 4A, 4B, 4C, 10, 13, and 15 are cross-sectional views, but hatching lines are omitted for simplification of the drawings.

The display device 1A according to the first embodiment includes:

an image display device 20;

a plate-shaped transparent member 130; and a light reflecting portion 140.

Then, the transparent member 130 includes:

a first surface 131 facing an observer 60 who observes an image;

a light incident surface 133 on which light emitted from the image display device 20 is incident; and a second surface 132 that faces the first surface 131 and totally reflects the light incident from the light incident surface 133, the first surface 131 includes a first portion 131A and a second portion 131B, the second portion 131B is located in a region close to the light incident surface 133, the first portion 131A extends from the second portion 131B and is located in a region far from the light incident surface 133, and the light reflecting portion 140 is provided inside the transparent member 130 corresponding to the first portion 131A of the first surface 131 of the transparent member 130 or in the first portion 131A (in the illustrated example, the inside of the transparent member 130) of the first surface 131 of the transparent member 130.

Then, moreover, a part of the light emitted from the image display device 20 is incident from the light incident surface 133, totally reflected by the second surface 132, further reflected by the light reflecting portion 140, emitted from the first portion 131A of the first surface 131, and reaches a pupil 61 of the observer 60, and another part of the light (unnecessary light) emitted from the image display device 20 is incident from the light incident surface 133, collides with the second portion 131B of the first surface 131, and does not reach the pupil 61 of the observer 60.

The light reflecting portion 140 includes a plurality of light reflecting segments 141. Then, a portion where a light beam emitted from a center of the image display device 20 and perpendicularly incident on the pupil 61 of the observer 60 is emitted from the transparent member 130 is referred to as a center of the transparent member 130, an orthogonal projection image of a trace of a light beam emitted from a center of the image display device 20 in the transparent member 130 on the second surface 132 is assumed as an X axis, a normal line of the second surface 132 passing through the center of the transparent member 130 is assumed as a Z axis, an axis orthogonal to the X axis and the Z axis is assumed as a Y axis, when an arrangement pitch along the Y direction parallel to the Y axis of the light reflecting segment 141 that is provided in the region close to the light incident surface 133 is $P_{N\text{-}Y}$, and an arrangement pitch along the Y direction parallel to the Y axis of the light reflecting segment 141 that is provided in the region far from the light incident surface 133 is assumed as $P_{F\text{-}Y}$, $$P_{N\text{-}Y} > P_{F\text{-}Y}$$

is satisfied. The arrangement pitch of the light reflecting segments 141 along the X direction can be, for example, constant, but is not limited thereto. Furthermore, when the size of the light reflecting segment 141 that is provided in a region close to the light incident surface 133 is denoted by $S_N$, and the size of the light reflecting segment 141 that is provided in a region far from the light incident surface 133 is assumed as $S_F$, $$S_N < S_F$$

is satisfied.

In the first embodiment, the light reflecting segments 141 are inclined from a first end portion (upper end portion) $141_{UP\text{-}1}$ far from the observer 60 and close to the second surface 132 and close to the light incident surface 133 toward a second end portion (lower end portion) $141_{DN\text{-}1}$ close to the observer 60 and close to the first surface 131 and far from the light incident surface 133. Then, the sizes of the light reflecting segments 141 change along the inclination direction (the inclination direction from the first end portion $141_{UP\text{-}1}$ to the second end portion $141_{DN\text{-}1}$). Specifically, the sizes increase. Furthermore, the arrangement pitches of the light reflecting segments 141 in the direction orthogonal to the inclination direction change along the inclination direction. Specifically, the pitches decrease. The plurality of light reflecting segments 141 constituting the light reflecting portions 140 is only required to have substantially the same specifications (optical characteristics) except for the size and the arrangement pitch. The plurality of light reflecting segments 141 may be randomly arranged in the X direction and the Y direction, or may be arranged in the Y direction but not in the X direction as illustrated, and the arrangement state of the light reflecting segments 141 may be essentially arbitrary.

In the example illustrated in FIGS. 1A, 1B, 2, and 3A, another part of the light emitted from the image display device 20 is incident from the light incident surface 133, collides with the second portion 131B of the first surface 131, is totally reflected by the second portion 131B, and is emitted out of the system from the end surface 134 of the transparent member 130 facing the light incident surface 133 without colliding with the light reflecting segments 141 or without colliding with the second surface 132 and the light reflecting segments 141. In other words, the second portion 131B is designed such that another part of the light emitted from the image display device 20 is incident from the light incident surface 133, collides with the second portion 131B of the first surface 131, is totally reflected by the second portion 131B, and is emitted out of the system from the end surface 134 of the transparent member 130 facing the light incident surface 133 without colliding with the light reflecting segments 141 or without colliding with the second surface 132 and the light reflecting segments 141. The second portion 131B is inclined with respect to the first portion 131A. An angle θ formed by the surface of the second portion 131B and the surface of the first portion 131A exceeds 180 degrees. In FIG. 3A, an extension line of second portion 131B is indicated by a three-dot chain line.

Note that, in FIGS. 1A, 2, 3A, 3B, 3C, 4A, 4B, 4C, 10, 13, and 15, a part of light emitted from the image display device 20 is indicated by a solid line, a one-dot chain line, and a two-dot chain line, in which the solid line indicates a light beam emitted from the center of the image display device 20, the one-dot chain line indicates a light beam emitted from one end portion in a ζ direction (described later) corresponding to the X direction of the image display device 20, and the two-dot chain line indicates a light beam emitted from another end portion in the ζ direction corresponding to the X direction of the image display device 20. Furthermore, another part (unnecessary light) of the light emitted from the image display device 20 is indicated by a dotted line, but is light that does not contribute to image formation, and may be referred to as "stray light" for convenience. In the image display device 20 in the first embodiment, since a lens system for making the light emitted from the image display device 20 substantially parallel light is not provided, the light emitted from the image display device 20 is not parallel light, and unnecessary light (stray light) tends to be generated.

The display device 1A further includes a frame 10 mounted on the head of the observer 60, and the image display device 20 is attached to the frame 10. Specifically, a housing 30 in which image display device 20 is stored is attached to a front portion 11. That is, the image display device 20 is located above the transparent member 130 with respect to the observer 60. Attachment of the image display device 20 to the frame 10 (specifically, attachment of the housing 30 to the front portion 11) is only required to be performed by an appropriate method such as a method using a screw, for example. The display device may include one image display device 20 (single-eye type) or may include two image display devices as illustrated (binocular type).

Then, the image display device 20 has a plurality of pixels arranged in a two-dimensional matrix in the ζ direction corresponding to the X direction and the η direction corresponding to the Y direction. Specifically, an image display device including a plurality of light emitting elements such as organic EL light emitting elements and light emitting diodes (LEDs) can be mentioned. The image display device 20 can perform image display of a single color (for example, green) or color image display.

The entire transparent member 130 including the light reflecting portion 140 is a semi-transmissive type (see-through type), and an outside view can be viewed through the transparent member 130 including the light reflecting portion 140. The portion of the transparent member 130 including the light reflecting portions 140 preferably has a light transmission ratio of external light in the Z direction of 0.7 or more. That is, in the transparent member 130 (including the light reflecting portions 140), 70% or more of the external light (light) incident from the Z direction via the second surface 132 preferably passes through the portion of the transparent member 130 (including the light reflecting portions 140) and is emitted from the first surface 131. Furthermore, it is preferable to arrange the light reflecting segments 141, determine the sizes of the light reflecting segments 141, and determine the arrangement pitches of the light reflecting segments 141 so as to satisfy such a condition.

The transparent member 130 is formed by, for example, optical glass or a plastic material. The light reflecting segments 141 each include, for example, a light reflecting layer including a metal reflecting film including aluminum. However, the present invention is not limited thereto, and can be configured by an alloy reflecting film or a dielectric multilayer film. Alternatively, the light reflecting segments 141 may each have a stacked structure of a light reflecting layer and a light absorbing layer. As a planar shape of the light reflecting segment 141, a circle, an ellipse (in the illustrated example, an ellipse such that a figure when orthogonally projected onto the second surface 132 is circular but is illustrated as an ellipse, and the same applies to FIG. 16 to be described later), and a smooth closed curve can be mentioned, but these are not restrictive. The light reflecting segment 141 is formed on a flat base (constituted by a part of the transparent member 130).

Furthermore, although not illustrated, a light absorbing film may be formed on the outer surface of the second surface 132, whereby the amount of external light incident on the transparent member 130 from the second surface 132 can be reduced to an appropriate amount of light, a sunglasses type display device in which external light is not dazzled can be obtained, and an image to be observed can be made relatively brighter than the outside world.

In the display device 1A of the first embodiment, the two temple portions 12 are each integrated with the front portion 11. Note that the temple portion 12 may be rotatably attached to an end portion of the front portion 11 via a hinge. That is, the frame 10 includes a front portion 11 arranged in front of the observer 60, two temple portions 12 extending from both ends of the front portion 11, and a temple tip (also called a tip cell, earpiece, or ear pad) 13 attached to a tip portion of each temple portion 12. When the entire display device 1A of the first embodiment is viewed, the frame 10 has substantially the same appearance as ordinary glasses or sunglasses.

Moreover, a wiring (signal line, power supply line, or the like) 14 extending from the image display device 20 extends from a tip portion of the temple tip 13 to the outside via the temple portion 12 and the inside of the temple tip 13, and is connected to a control device (control circuit and control means) 16. Moreover, the image display device 20 includes the headphone part 15, and a wiring 15' for the headphone part extending from the image display device 20 extends from the tip portion of the temple tip 13 to the headphone part 15 via the temple portion 12 and the inside of the temple tip 13. More specifically, the wiring 15' for the headphone part extends from the tip portion of the temple tip 13 to the headphone part 15 so as to wrap around the back side of the pinna (auricle). With such a configuration, it is possible to obtain a clear display device without giving an impression that the headphone part 15 and the wiring 15' for the headphone part are randomly arranged.

As described above, the wiring (signal line, power supply line, or the like) 14 is connected to the control device (control circuit) 16. The control device 16 is provided with, for example, an image information storage device (not illustrated). Then, processing for image display is performed in the control device 16. The control device 16 and the image information storage device can include well-known circuits.

In the display device, light (stray light) that does not contribute to image formation may be generated in the image display device. When such stray light is emitted from the image display device, is incident on the light incident surface of the transparent member, for example, collides with an extending portion of the first surface corresponding to the second portion of the first surface in the display device of the first embodiment, is totally reflected by this extending portion, is reflected by the light reflecting segment, and is incident on the pupil of the observer, or is totally reflected by this extending portion, is totally reflected further by the second surface, is reflected by the light reflecting segment, and is incident on the pupil of the observer, such stray light is recognized by the observer as a "ghost". Here, the ghost is specifically, for example, an image that has a lower light intensity than the light intensity of an image to be displayed, and the image to be displayed is, for example, an inverted image. Although the light intensity is low, the image is interesting to the observer.

However, in the display device of the first embodiment, another part (unnecessary light, stray light) of the light emitted from the image display device is incident from the light incident surface and collides with the second portion of the first surface, and for example, is totally reflected by the second portion and emitted out of the system from the end surface of the transparent member facing the light incident surface without colliding with the light reflecting portion or without colliding with the second surface and the light reflecting segment. Therefore, stray light does not enter the pupil of the observer, and the observer does not recognize the "ghost".

Furthermore, since the reflective volume hologram diffraction grating is not used, it is not necessary to use a bright light source, and it is possible to reduce the size and weight of the display device. In addition, as illustrated in FIG. 8, when the X direction (vertical direction) is assumed as $L_X$, the Y direction (horizontal direction) is assumed as $L_Y$, a distance from the observer to the light reflecting portion is assumed as L, an angle of view in the X direction as viewed from the observer is assumed as $\theta'_X$, and an angle of view in the Y direction is assumed as $\theta'_Y$, the size of the light reflecting portion satisfies at least $$L_X = 2L \times \tan(\theta'_X/2),$$

$$L_Y = 2L \times \tan(\theta'_Y/2),$$

and moreover, when the allowable range of the position of the pupil of the observer in the X direction is assumed as $E_X$ and the allowable range in the Y direction is assumed as $E_Y$, $$L_X = 2L \times \tan(\theta'_X/2) + E_X,$$

$$L_Y = 2L \times \tan(\theta'_Y/2) + E_Y,$$

is satisfied. Therefore, even in a case where the positional relationship between the image display device and the pupil of the observer changes, the light emitted from the transparent member reliably reaches the pupil of the observer, and a sufficient wide angle of view (for example, 40 degrees)

can be achieved. Moreover, although there is a difference in pupillary distance (PD) depending on the observer, in the binocular type, it can be used in the same manner even among observers having a difference in the pupillary distance, and special adjustment is unnecessary. Then, even if the pupil of the observer moves with respect to the transparent member, the image from the light reflecting segment facing the pupil reaches the pupil of the observer, and thus, even if the pupil of the observer moves with respect to the transparent member, the observer can reliably observe the image from the image display device.

A part of the image generated in the image display device is reflected by the light reflecting portion and reaches the pupil of the observer, but the remaining part of the image generated in the image display device is emitted out of the system without being reflected by the light reflecting portion. Here, since the light reflecting portion is configured such that the information of all the angles of view of the image generated in the image display device reaches the pupil of the observer, the observer can recognize the entire image generated in the image display device although a part of the light amount emitted from the image display device is lost. Furthermore, since the external light enters the pupil of the observer through a gap of the light reflecting portion where the light reflecting segment is not provided, the observer can recognize the external light and the outside world. Since the distance from the transparent member to the pupil of the observer is short, the observer can recognize the entire outside world even in a state in which a part of the external light actually reaches the pupil of the observer as described above.

A modification of the second portion 131B of the first surface 131 will be described below. Schematic views in which a boundary region between the first portion and the second portion of the first surface of the transparent member in the display device of the first embodiment is enlarged in the XZ virtual plane are illustrated in FIGS. 3B, 3C, 4A, 4B, and 4C.

Figure 3B:
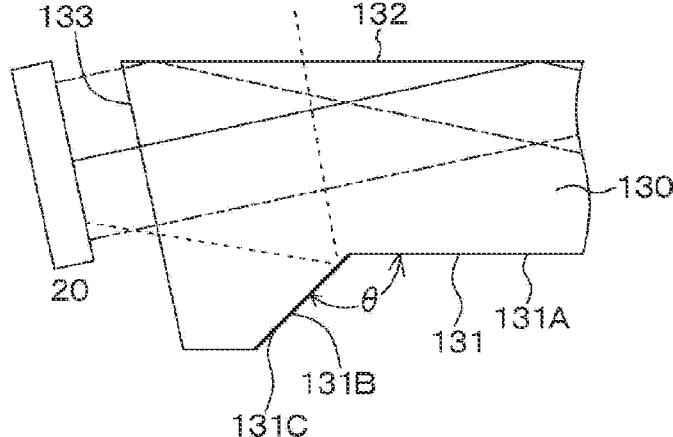

As illustrated in FIG. 3B, a mode can be employed in which the light is incident from the light incident surface 133, collides with the second portion 131B of the first surface 131, is reflected by the second portion 131B, and is emitted out of the system from the second surface 132, for example, without colliding with the light reflecting segment 141. In this case, the second portion 131B is inclined with respect to the first portion 131A, and for example, a light reflecting film 131C is preferably formed. Note that the angle θ formed by the surface of the second portion 131B and the surface of the first portion 131A exceeds 180 degrees, or is less than 180 degrees as illustrated.

Figure 3C:
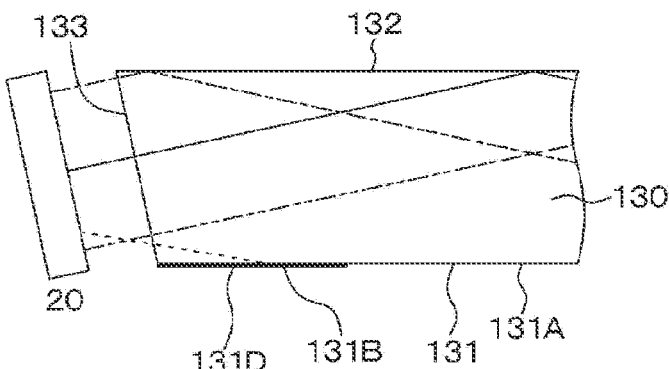

Alternatively, as illustrated in FIG. 3C, a mode can be employed in which another part (unnecessary light, stray light) of the light emitted from the image display device 20 is absorbed by a light absorbing material layer 131D formed in the second portion 131B of the first surface 131.

Figure 4A:
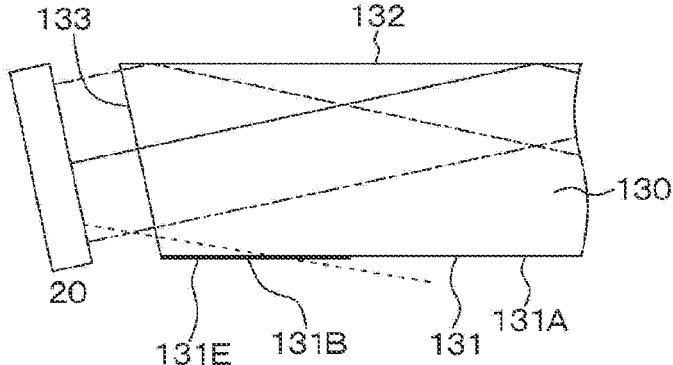
FIGS. 4A, 4B, and 4C are schematic views in which the boundary region between the first portion and the second portion of the first surface of the transparent member in a modification of the display device of the first embodiment is enlarged in the XZ virtual plane.

Alternatively, as illustrated in FIG. 4A, a mode can be employed in which another part (unnecessary light, stray light) of the light emitted from the image display device 20 is emitted out of the system via a multilayer film 131E (illustrated as one layer in the drawing) formed in the second portion 131B of the first surface 131.

Figure 4B:
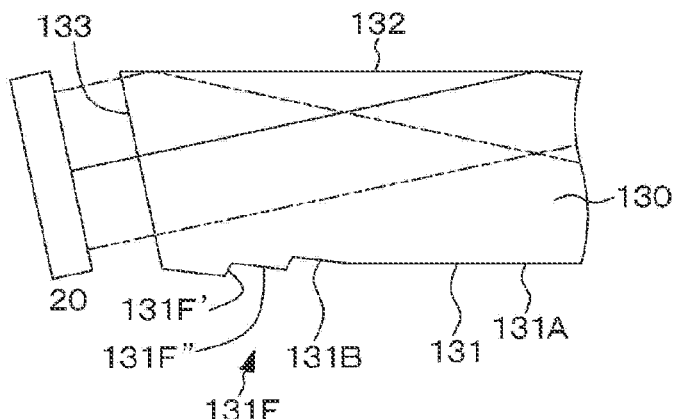
Figure 4C:
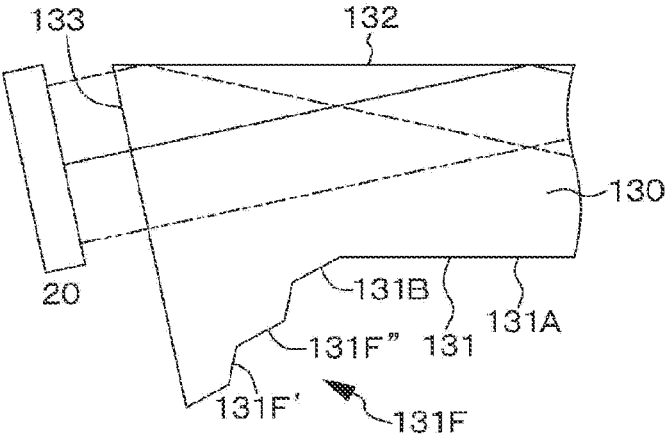

Alternatively, as illustrated in FIG. 4B, a mode can be employed in which an uneven portion 131F (fine uneven portion) may be provided in the second portion 131B of the first surface 131. Note that the light that has collided with a first inclined surface 131F' of the uneven portion is reflected by the first inclined surface 131F' (for example, a light reflecting film which is not illustrated is formed) of the uneven portion, and is emitted out of the system, and the light that has collided with a second inclined surface 131F" of the uneven portion is totally reflected by the second inclined surface 131F" of the uneven portion, and is emitted out of the system from the end surface 134 or the second surface 132 of the transparent member 130 facing the light incident surface 133 without colliding with the light reflecting segments 141 or without colliding with the second surface 132 and the light reflecting segments 141. Alternatively, as illustrated in FIG. 4C, the light reflected by the first inclined surface 131F' (for example, a light reflecting film which is not illustrated is formed) of the uneven portion, emitted out of the system, and colliding with the second inclined surface 131F" (for example, a light reflecting film is formed) of the uneven portion is reflected by the second inclined surface 131F" of the uneven portion, and is emitted out of the system from the second surface 132, for example, without colliding with the light reflecting segments 141.

Information and data related to an image to be displayed on the image display device 20 or a signal to be received by a reception device is recorded, stored, and saved in, for example, what is called a cloud computer or server. By the display device 1A including a communication means (transmission/reception device) such as a mobile phone or a smartphone, or by incorporating a communication means (reception device) in the control device (control circuit and control means) 16 provided in the display device 1A, various kinds of information, data, and signals can be exchanged between the cloud computer or the server and the display device 1A via the communication means, a signal based on various kinds of information and data, that is, a signal for displaying an image on the image display device 20 can be received, and the reception device can receive the signal.

Specifically, when the observer inputs a request for "information" to be obtained to the mobile phone or the smartphone, the mobile phone or the smartphone accesses the cloud computer or the server and obtains the "information" from the cloud computer or the server. In this manner, the control device 16 receives a signal for displaying the image in the image display device 20. The control device 16 performs known image processing on the basis of this signal, and displays the "information" as an image on the image display device 20. The image representing this "information" reaches the pupil 61 of the observer 60 via the transparent member 130 and the light reflecting portion 140.

In some cases, the signal for displaying the image in the image display device 20 may be stored in the display device 1A (specifically, the control device 16).

Alternatively, an image captured by a camera (not illustrated) provided in the display device 1A may be sent to the cloud computer or the server via the communication means, the cloud computer or the server may search for various types of information and data corresponding to the image captured by the camera, the found various types of information and data may be sent to the display device 1A via the communication means, and the found various types of information and data may be displayed on the image display device 20.

Second Embodiment

A second embodiment relates to a display device according to the second and third aspects of the present disclosure. In the second embodiment, the second portion 131B of the first surface 131 of the transparent member 130 in the first embodiment is not provided. Furthermore, the image display device 20 in the first embodiment is not provided with a lens system for making light emitted from the image display device 20 substantially parallel light, but the image display device 20 in the second embodiment is provided with a lens system for making light emitted from the image display device 20 substantially parallel light, and has a structure in which stray light is hardly emitted from the image display device 20.

Figure 9:
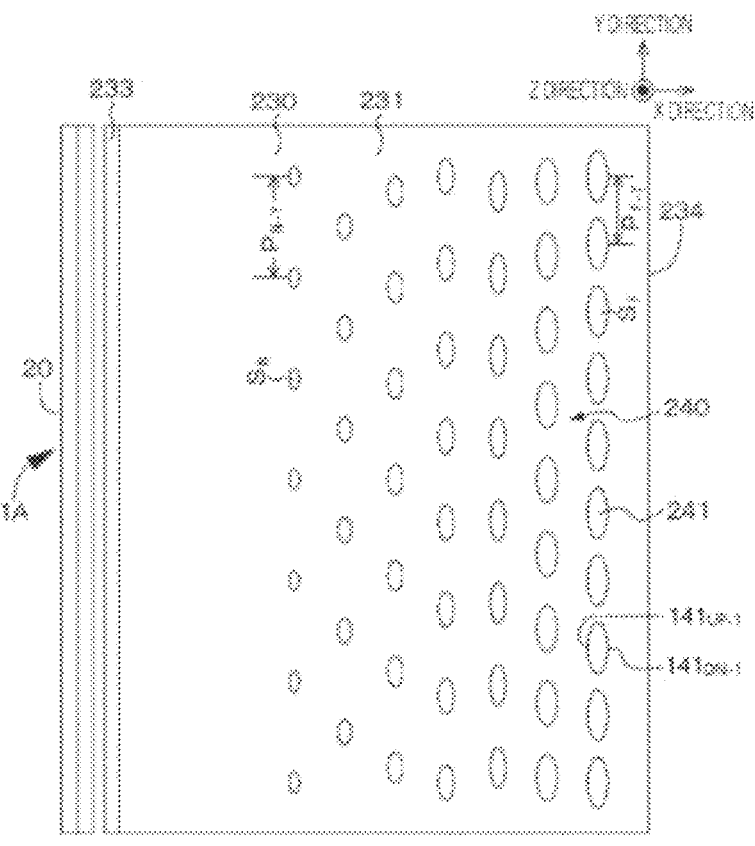
FIG. 9 is a schematic view of the transparent member and the image display device in the display device of a second embodiment as viewed from the observer side.
Figure 10:
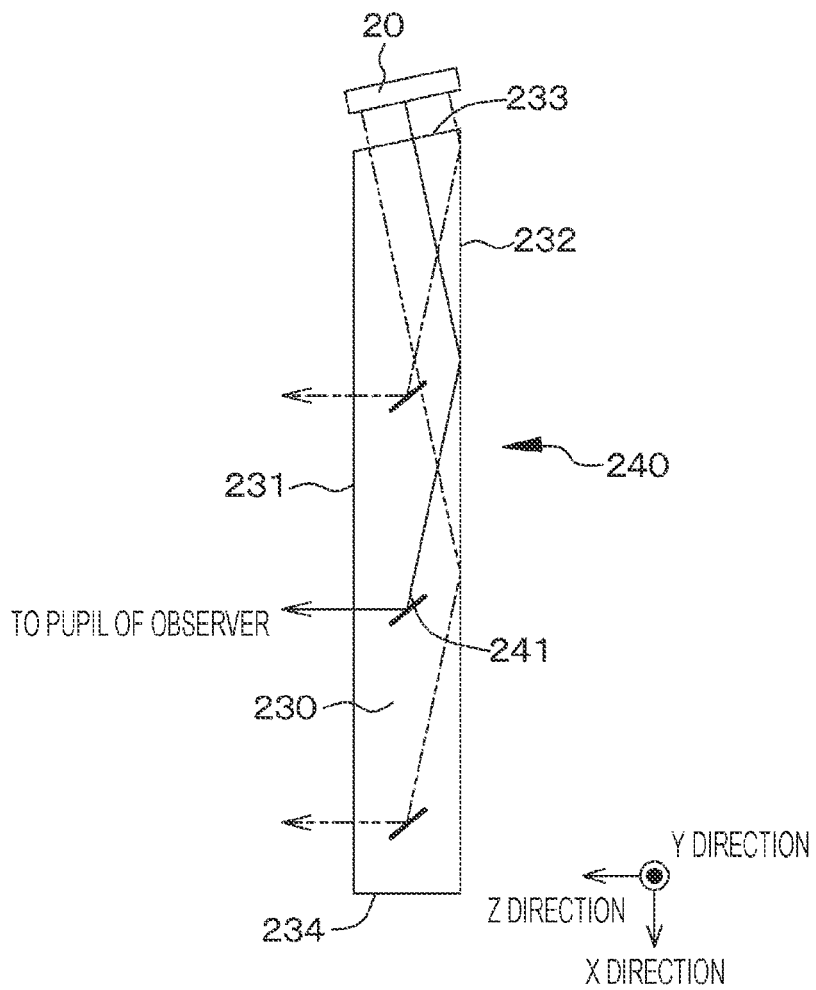
FIG. 10 is a schematic cross-sectional view of the transparent member and the image display device in the display device of the second embodiment taken along the XZ virtual plane.

As a schematic view of the transparent member and the image display device in the display device of the second embodiment as viewed from the observer side is illustrated in FIG. 9, and as a schematic cross-sectional view of the transparent member and the image display device in the display device of the second embodiment taken along the XZ virtual plane is illustrated in FIG. 10, the display device of the second embodiment includes:
an image display device 20;
a plate-shaped transparent member 230; and
a light reflecting portion 240.
Then, the transparent member 230 includes:
a first surface 231 facing the observer 60 who observes the image;
a light incident surface 233 on which light emitted from the image display device 20 is incident; and
a second surface 232 that faces the first surface 231 and totally reflects the light incident from the light incident surface 233.
Then, moreover,
the light reflecting portions 240 are provided inside the transparent member 230 or on the first surface of the transparent member (in the illustrated example, it is provided inside the transparent member 230),
the light emitted from the image display device 20 is incident from the light incident surface 233, totally reflected by the second surface 232, further reflected by the light reflecting portion 240, emitted from the first surface 231, and reaches the pupil 61 of the observer 60, and
the light reflecting portion 240 includes a plurality of light reflecting segments 241.
Here, in the display device of the second embodiment, when the size of the light reflecting segment 241 that is provided in the region close to the light incident surface 233 is assumed as $S_N$, and the size of the light reflecting segment 241 that is provided in the region far from the light incident surface 233 is assumed as $S_F$, $$S_N < S_F$$

is satisfied.
Furthermore, in the display device of the second embodiment, in addition to or independently of the above,
a portion where a light beam emitted from the center of the image display device 20 and perpendicularly incident on the pupil 61 of the observer 60 is emitted from the transparent member 230 is referred to as a center of the transparent member 230,
an orthogonal projection image of a trace of a light beam emitted from the center of the image display device 20 in the transparent member 230 on the second surface 232 is assumed as an X axis,
a normal line of the second surface 232 passing through the center of the transparent member 230 is assumed as a Z axis,
an axis orthogonal to the X axis and the Z axis is assumed as a Y axis, and
when an arrangement pitch along the Y direction parallel to the Y axis of the light reflecting segment 241 that is provided in the region close to the light incident surface 233 is assumed as $P_{N-Y}$, and an arrangement pitch along the Y direction parallel to the Y axis of the light reflecting segment 241 that is provided in the region far from the light incident surface 233 is assumed as $P_{F-Y}$, $$P_{N-Y} > P_{F-Y}$$

is satisfied.

In the second embodiment, it is preferable that the image display device 20 is, for example, an image display device including light emitting elements such as organic EL light emitting elements or LEDs, and an image display device including a spatial light modulation device including a transmissive or reflective type liquid crystal display device, and a light source. Then, the image display device 20 includes a lens system (an optical system that makes the emitted light substantially parallel light). That is, the light emitted from the image display device 20 is made substantially parallel light by the lens system and is incident on the light incident surface 233.

Figure 11A:
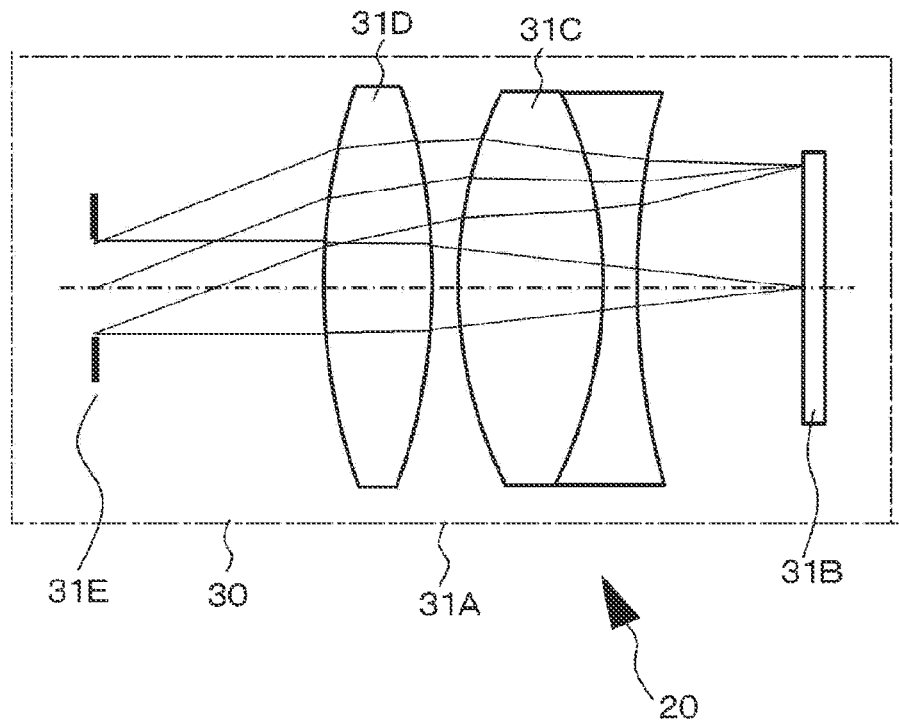
FIGS. 11A and 11B are conceptual diagrams of the image display device constituting the display device of the second embodiment.

In the second embodiment, the image display device 20 is the image display device of the first configuration, and includes a plurality of pixels arranged in a two-dimensional matrix. Specifically, as illustrated in FIG. 11A, the image display device 20 includes an organic EL display device 31B. The image emitted from the organic EL display device 31B passes through a first convex lens 31C constituting the lens system, further passes through a second convex lens 31D constituting the lens system, becomes substantially parallel light, and travels toward the transparent member 230. A front focal point $f_{2F}$ of the second convex lens 31D is located at a rear focal point $f_{1B}$ of the first convex lens 31C. Furthermore, a diaphragm 31E is arranged at a position of the rear focal point $f_{1B}$ of the first convex lens 31C (the front focal point $f_{2F}$ of the second convex lens 31D). The diaphragm 31E corresponds to an image emission unit. The entire image display device 20 is housed in a housing 31A (housing 30). The housing 31A is attached to the frame 10 by an appropriate means. The organic EL display device 31B includes a plurality of (for example, 640×480) pixels (organic EL light emitting elements) arranged in a two-dimensional matrix.

Figure 11B:
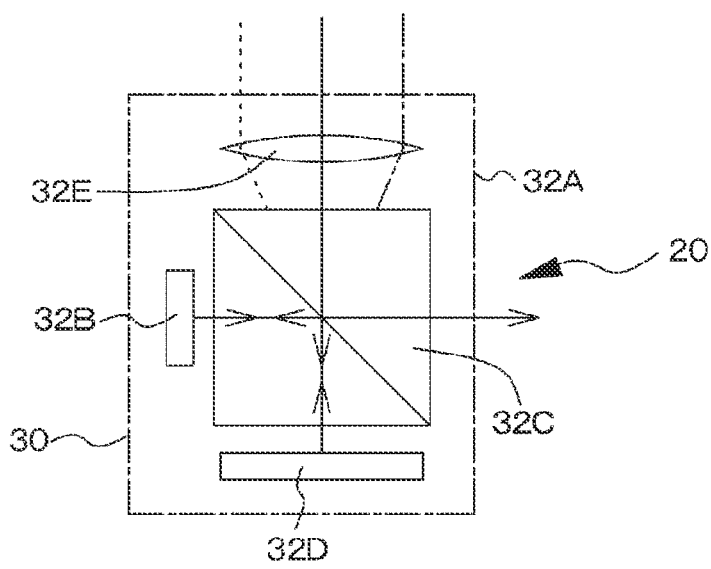

Alternatively, as illustrated in FIG. 11B, the image display device 20 is the image display device of the first configuration, and includes a plurality of pixels arranged in a two-dimensional matrix. Specifically, the image display device 20 includes a reflective type spatial light modulation device and a light source 32B including a light emitting diode that emits white light. The entire image display device 20 is housed in a housing 32A (indicated by a one-dot chain line in FIG. 5B), the housing 32A (housing 30) is provided with an opening (not illustrated), and light is emitted from an optical system (parallel light emission optical system, collimating optical system 32E) through the opening. The housing 32A is attached to the frame 10 by an appropriate means. The reflective type spatial light modulation device includes a liquid crystal display device (LCD) 32D including LCOS as a light valve. Moreover, a polarizing beam splitter 32C that reflects a part of the light from the light source 32B and guides the light to the liquid crystal display device 32D, and passes a part of the light reflected by the liquid crystal display device 32D and guides the light to the optical system 32E is provided. The liquid crystal display device 32D includes a plurality of (for example, 640×480) pixels (liquid crystal cell and liquid crystal display element) arranged in a two-dimensional matrix. The polarizing beam splitter 32C has a known configuration and structure. The unpolarized light emitted from the light source 32B collides with the polarizing beam splitter 32C. In the polarizing beam splitter 32C, a P polarization component passes therethrough and is emitted out of the system. On the other hand, an S polarization component is reflected by the polarizing beam splitter 32C, is incident on the liquid crystal display device 32D, is reflected inside the liquid crystal display device 32D, and is emitted from the liquid crystal display device 32D. Here, among light emitted from the liquid crystal display device 32D, the light emitted from a pixel displaying "white" contains a large amount of P polarization components, and light emitted from a pixel displaying "black" contains a large amount of S polarization components. Therefore, among the light emitted from the liquid crystal display device 32D and colliding with the polarizing beam splitter 32C, P polarization components pass through the polarizing beam splitter 32C and are guided to the optical system 32E. On the other hand, S polarization components are reflected by the polarizing beam splitter 32C and returned to the light source 32B. The optical system 32E includes, for example, a convex lens, and the image display device 20 (more specifically, the liquid crystal display device 32D) is arranged at a position (position) of a focal length in the optical system 32E in order to generate substantially parallel light. The image emitted from the image display device 20 reaches the pupil 61 of the observer 60 via the transparent member 130.

Figure 12:
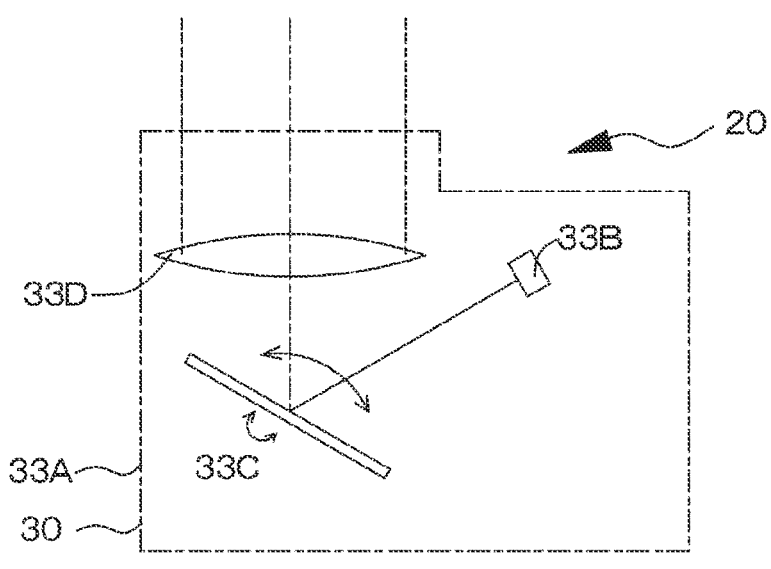
FIG. 12 is a conceptual diagram of the image display device constituting the display device of the second embodiment.

Alternatively, in the image display device 20, the image display device 20 may be the image display device 20 of the second configuration including a light source and a scanning means that scans light emitted from the light source to form an image. That is, as a conceptual diagram of the image display device 20 is illustrated in FIG. 12, it includes a light source 33B, a scanning means 33C that two-dimensionally scans substantially parallel light emitted from the light source 33B, and a lens system 33D that converts light emitted from the light source 33B into parallel light. The entire image display device 20 is housed in a housing 33A (housing 30), an opening (not illustrated) is provided in the housing 33A, and light is emitted from the lens system 33D through the opening. Then, the housing 33A is attached to the frame 10 by an appropriate means.

The light source 33B includes, for example, a semiconductor laser element. Then, the light emitted from the light source 33B is converted into substantially parallel light by a lens that is not illustrated, with which horizontal scanning and vertical scanning are performed by the scanning means 33C including a MEMS mirror that has a micromirror rotatable in two-dimensional directions and can two-dimensionally scan incident substantially parallel light, so as to form a kind of two-dimensional image, thereby generating virtual pixels (whose number of pixels is, for example, 640×480). Then, the light from the virtual pixel (the scanning means 33C corresponding to the image emission unit) passes through the lens system 33D having positive optical power, and the light flux converted into substantially parallel light enters the transparent member 230.

The transparent member 230 including the light reflecting portion 240 in the second embodiment can be manufactured, for example, by the following method.

Figure 19:
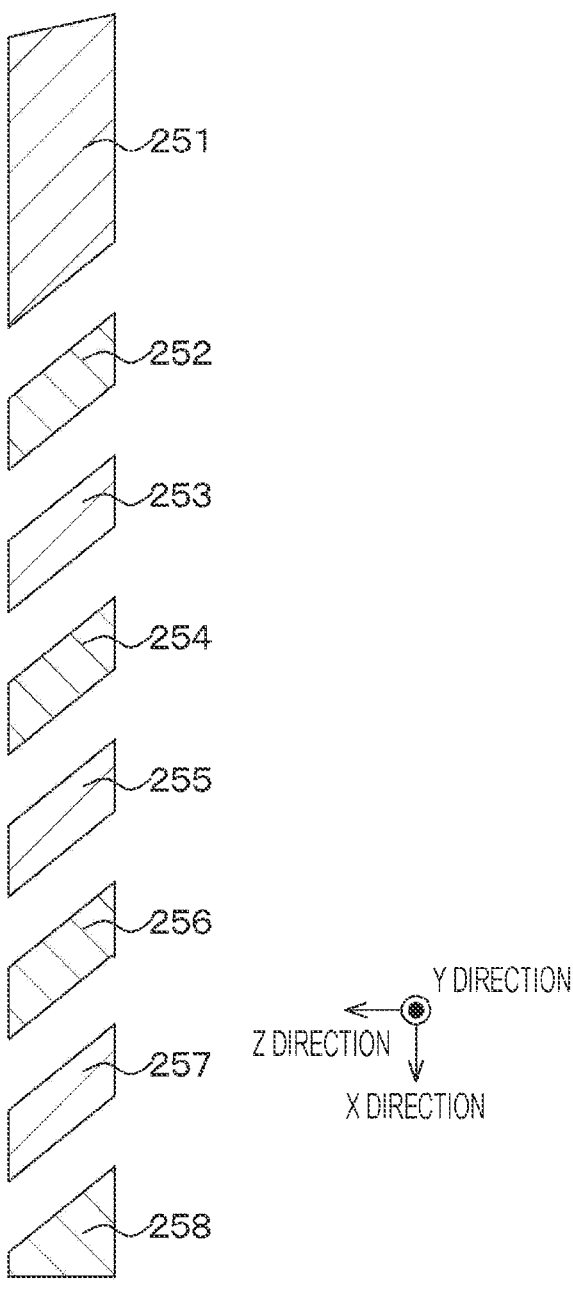
FIG. 19 is a schematic view for describing a method of manufacturing the transparent member including the light reflecting portion of the first and second embodiments.
Figure 20:
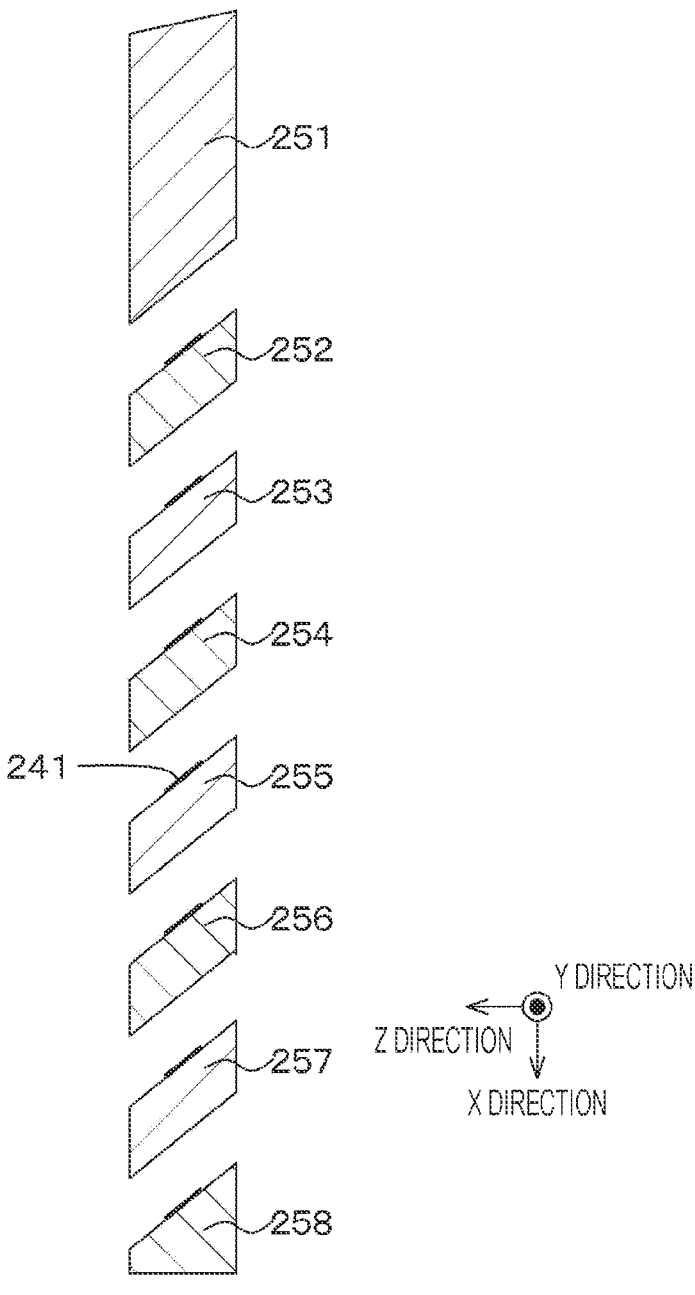
FIG. 20 is a schematic view for describing the method of manufacturing the transparent member including the light reflecting portions of the first and second embodiments, following FIG. 19.

First, a block-shaped (plate-like) transparent member is prepared. Then, the transparent member is cut so that the surface on which the light reflecting segment 241 is to be formed appears, and transparent member segments 251 to 258 are obtained (see FIG. 19). Then, the light reflecting segment 241 is formed on one surface of each of the transparent member segments 252 to 258 on which the light reflecting segment 241 is to be formed in a known manner (see FIG. 20). Thereafter, by bonding the transparent member segments 252 to 258 and the transparent member segment 251 on each of which the light reflecting segment 241 is formed, the transparent member 230 including the light reflecting portion 240 can be obtained. If necessary, after the transparent member segments are bonded, the first surface 131 and the second surface 132 may be polished. Alternatively, it is also possible to obtain the transparent member including a light reflecting portion by preparing a pair of transparent member segments having groove-shaped and mountain/valley-shaped uneven portions, forming the light reflecting segment in the uneven portion of one of the transparent member segments, and then bonding the pair of transparent member segments. The transparent member 130 including the light reflecting portion 140 in the first embodiment can also be obtained by similar methods to these methods.

Third Embodiment

Figure 13:
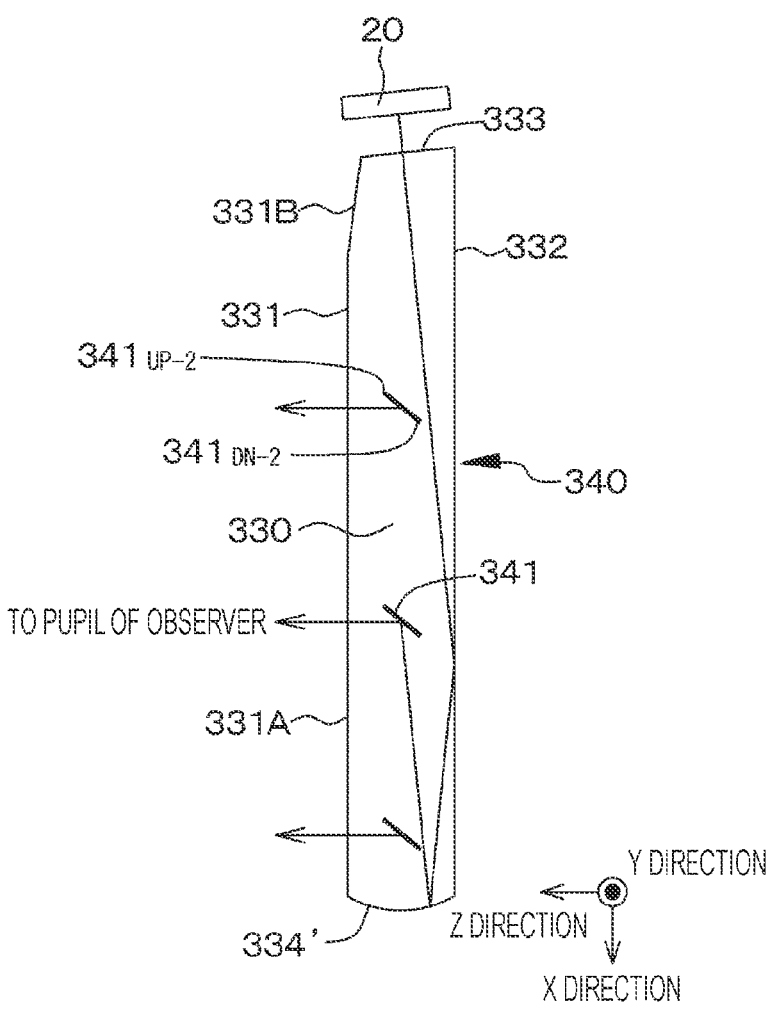
FIG. 13 is a schematic cross-sectional view of the transparent member and the image display device in the display device of a third embodiment taken along the XZ virtual plane.
Figure 14:
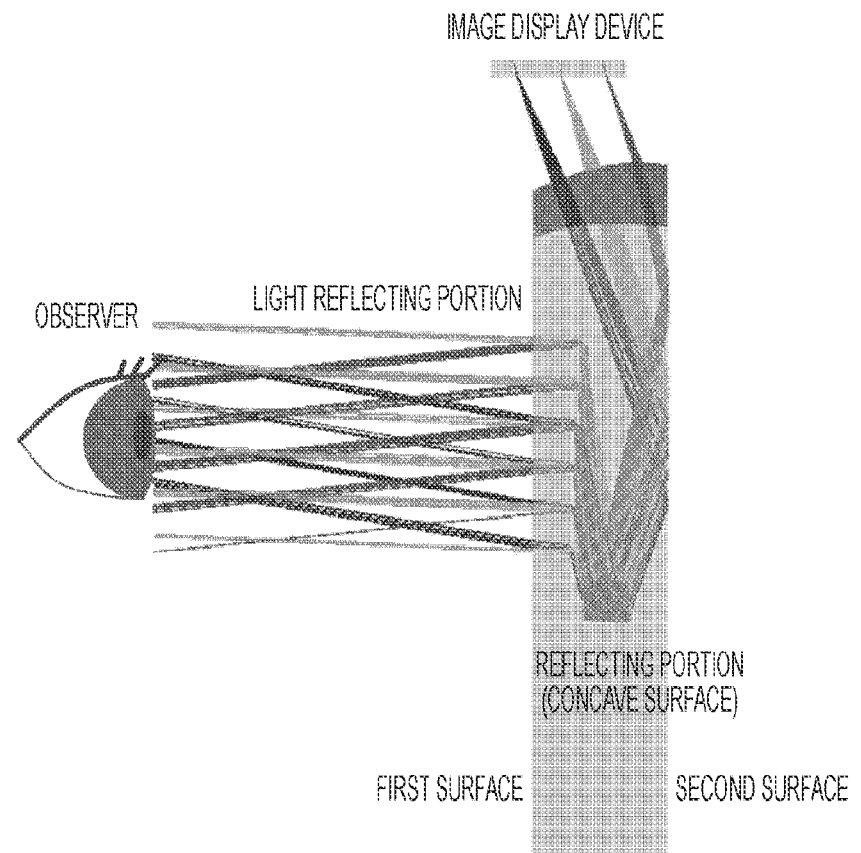
FIG. 14 is a schematic view illustrating behavior of a light beam in the transparent member in the display device and the image display device of the third embodiment on the XZ virtual plane.

A third embodiment is also a modification of the first embodiment. As a schematic cross-sectional view when the transparent member and the image display device in the display device of the third embodiment are cut in the XZ virtual plane is illustrated in FIG. 13, and as a behavior of the light beam in the transparent member and the image display device in the display device of the third embodiment in the XZ virtual plane is schematically illustrated in FIG. 14, in the display device of the third embodiment, a reflecting surface (specifically, a concave surface portion 334') is disposed at or near an end portion of the transparent member 330 facing the light incident surface 333, and a part of the light emitted from the image display device 20 is incident from the light incident surface 333, totally reflected by the second surface 332, reflected by the reflecting surface (concave surface portion 334'), further reflected by the light reflecting portion 340 and emitted from the first surface 331, and reaches the pupil 61 of the observer 60. The light incident on the concave surface portion 334' is reflected by the concave surface portion 334' and is emitted from the concave surface portion 334', and at this time, it is desirable that the light is emitted as substantially parallel light, so that the light emitted from the light reflecting portion 340 can have a predetermined parallelism. In the image display device 20 in the third embodiment, similarly to the first embodiment, since a lens system for making light emitted from the image display device 20 substantially parallel light is not provided, the light emitted from the image display device 20 is not parallel light, but is reflected by the concave surface portion 334' and emitted from the concave surface portion 334' as substantially parallel light (see FIG. 14). Note that reference numerals 331A and 331B denote a first portion and a second portion of the first surface 331, respectively.

In this case, the light reflecting segments 341 are inclined from a first end portion (upper end portion) $341_{UP-2}$ close to the observer 60 and close to the first surface 331 and close to the light incident surface 333 toward a second end portion (lower end portion) $341_{DN-2}$ away from the observer 60 and close to the second surface 332 and far from the light incident surface 333. Then, the sizes of the light reflecting segments 341 change along the inclination direction (the inclination direction from the first end portion $341_{UP-2}$ to the second end portion $341_{DN-2}$). Specifically, the sizes increase. Furthermore, the arrangement pitches of the light reflecting segments 341 in the direction orthogonal to the inclination direction change along the inclination direction. Specifically, the pitches decrease.

The concave surface portion 334' can be obtained, for example, by forming a light reflecting film on a base (having a convex shape in a case where an end portion of the transparent member 330 is viewed from the light incident surface 333 of the transparent member 330) for forming the concave surface portion 334' at the end portion of the transparent member 330. The concave surface portion 334' has what is called a cylindrical concave mirror shape. That is, the cross-sectional shape when the concave surface portion 334' is cut along the XZ virtual plane and the YZ virtual plane is "concave" (for example, a part of a circle, a part of a parabola, a part of a sine curve, a part of an ellipse, a part of a catenary curve, and the like). However, the radius of curvature in the cross-sectional shape when the concave surface portion is cut along the XZ virtual plane (the radius of the circle in contact with the central portion of the cross-section when cut along the XZ virtual plane) and the radius of curvature in the cross-sectional shape when the concave surface portion is cut along the YZ virtual plane (the radius of the circle in contact with the central-high portion of the cross-section when cut along the YZ virtual plane) are different.

Except for the above points, the configuration and structure of the display device of the third embodiment can be similar to the configuration and structure of the display device described in the first embodiment, and thus detailed description is omitted. In the display device of the first embodiment, an optical surface (optical member) for making the light emitted from the transparent member substantially parallel light is required between the image display device and the pupil of the observer in some cases, but in the display device of the third embodiment, such an optical surface is unnecessary.

Fourth Embodiment

Figure 15:
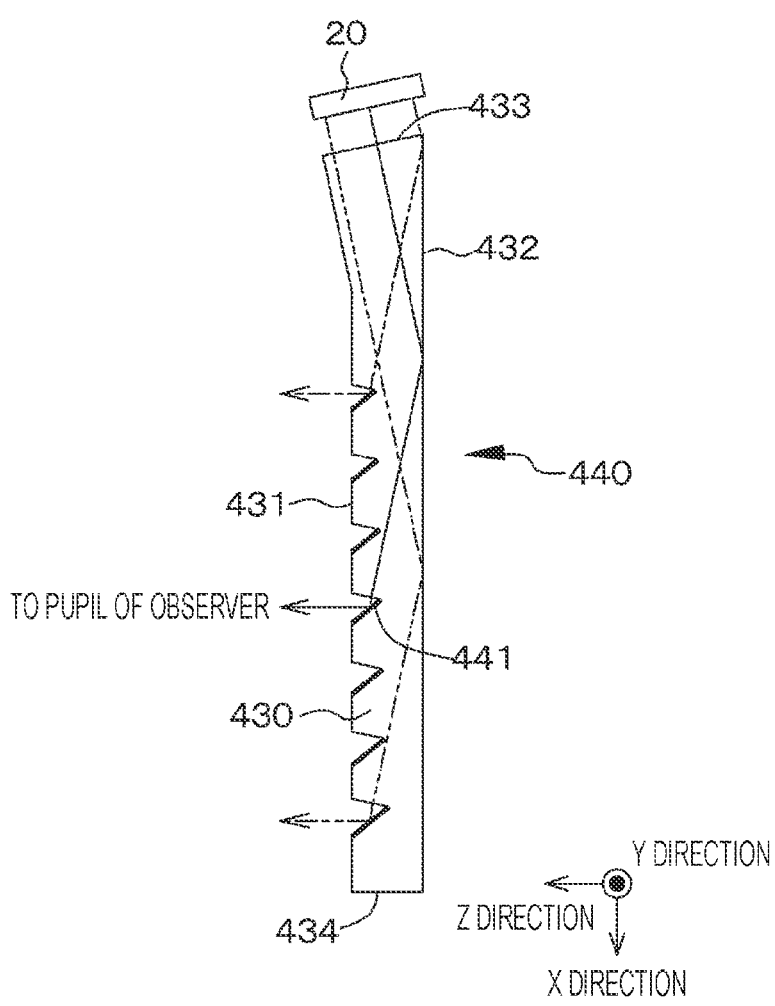
FIG. 15 is a schematic cross-sectional view of the transparent member and the image display device in the display device of a fourth embodiment taken along the XZ virtual plane.

A fourth embodiment is a modification of the first to third embodiments. In the first to third embodiments, the light reflecting portions 140, 240, and 340 are provided inside the transparent member 130 corresponding to the first portion 131A of the first surface 131, or provided inside the transparent member 230 and 330. On the other hand, in the fourth embodiment, as a schematic cross-sectional view when the transparent member and the image display device in the display device of the fourth embodiment are cut along the XZ virtual plane is illustrated in FIG. 15, the light reflecting portion 440 and the light reflecting segment 441 are provided on the first surface 431 of the transparent member 430. Alternatively, although not illustrated, the light reflecting portions 440 are provided on the first surface of the transparent member corresponding to the first portion of the first surface.

Except for the above points, the configuration and structure of the display device of the fourth embodiment can be similar to the configuration and structure of the display device described in the first to third embodiments, and thus detailed description is omitted. Note that the light reflecting segments 441 in the fourth embodiment can be obtained by forming uneven portions or mountain/valley-shaped groove portions on the first surface 431 of the transparent member 430 and forming the light reflecting segments 441 on one surface of the uneven portions or one inclined surface of the mountain/valley-shaped groove portions.

Fifth Embodiment

A fifth embodiment is a modification of the first to fourth embodiments. In the first to fourth embodiments, the image display device 20 is positioned above the transparent member 130, 230, 330, and 430 with respect to the observer 60. On the other hand, in the fifth embodiment, the image display device 20 is located closer to the ear side of the observer 60 than the transparent member 130, 230, 330, and 430.

Figure 16:
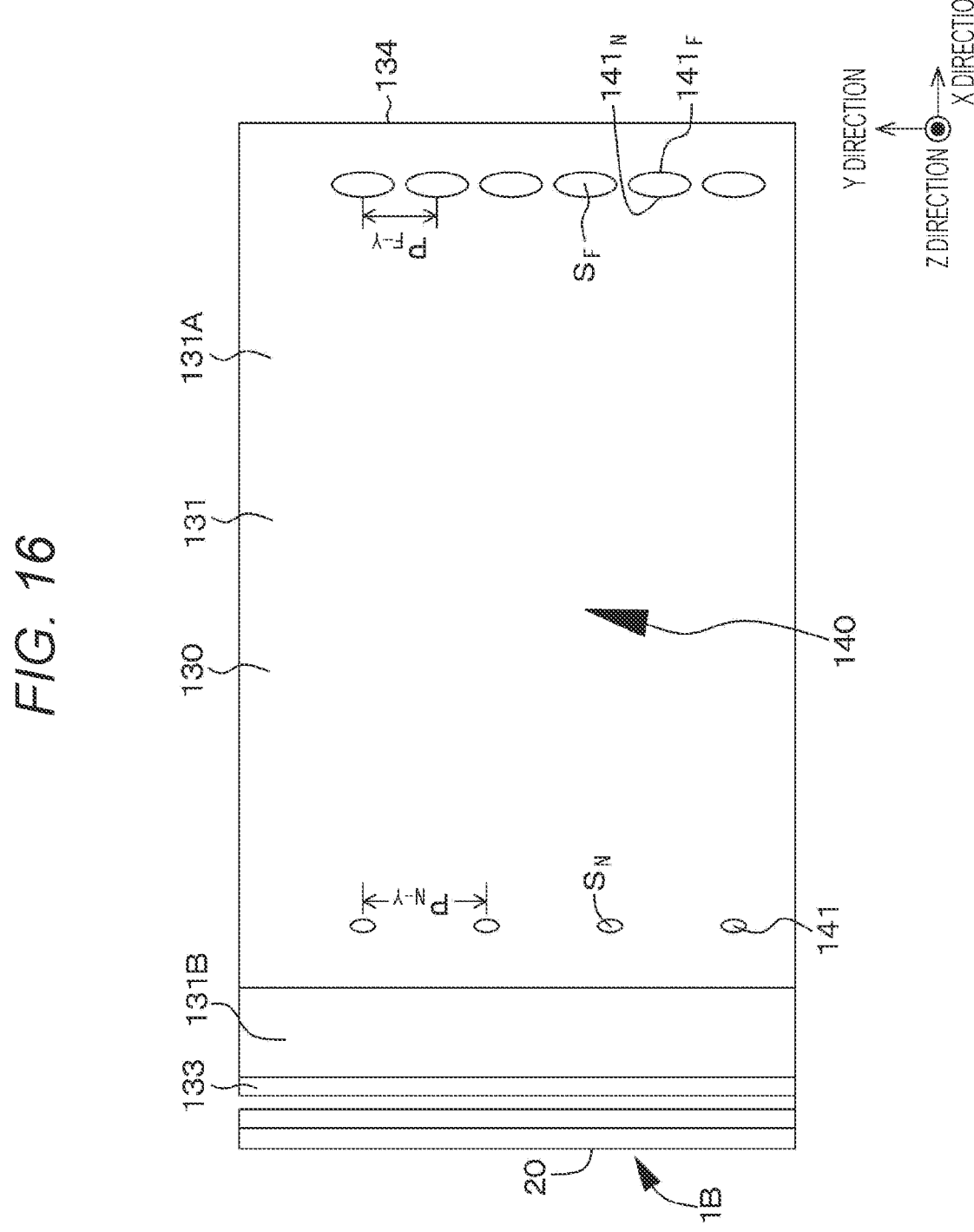
FIG. 16 is a schematic view of the transparent member and the image display device in the display device of a fifth embodiment as viewed from the observer side.
Figure 17:
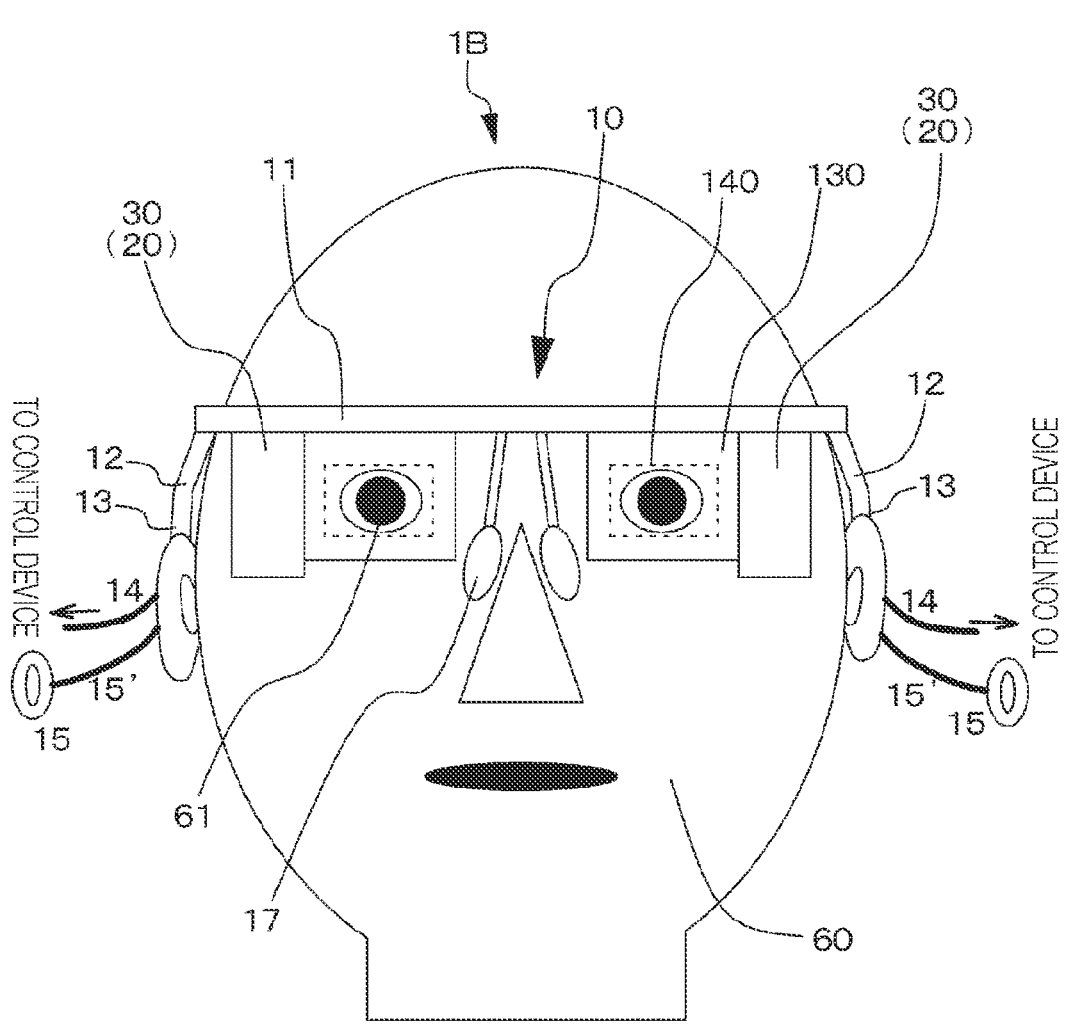
FIG. 17 is a schematic view of the display device of the fifth embodiment as viewed from the front.
Figure 18:
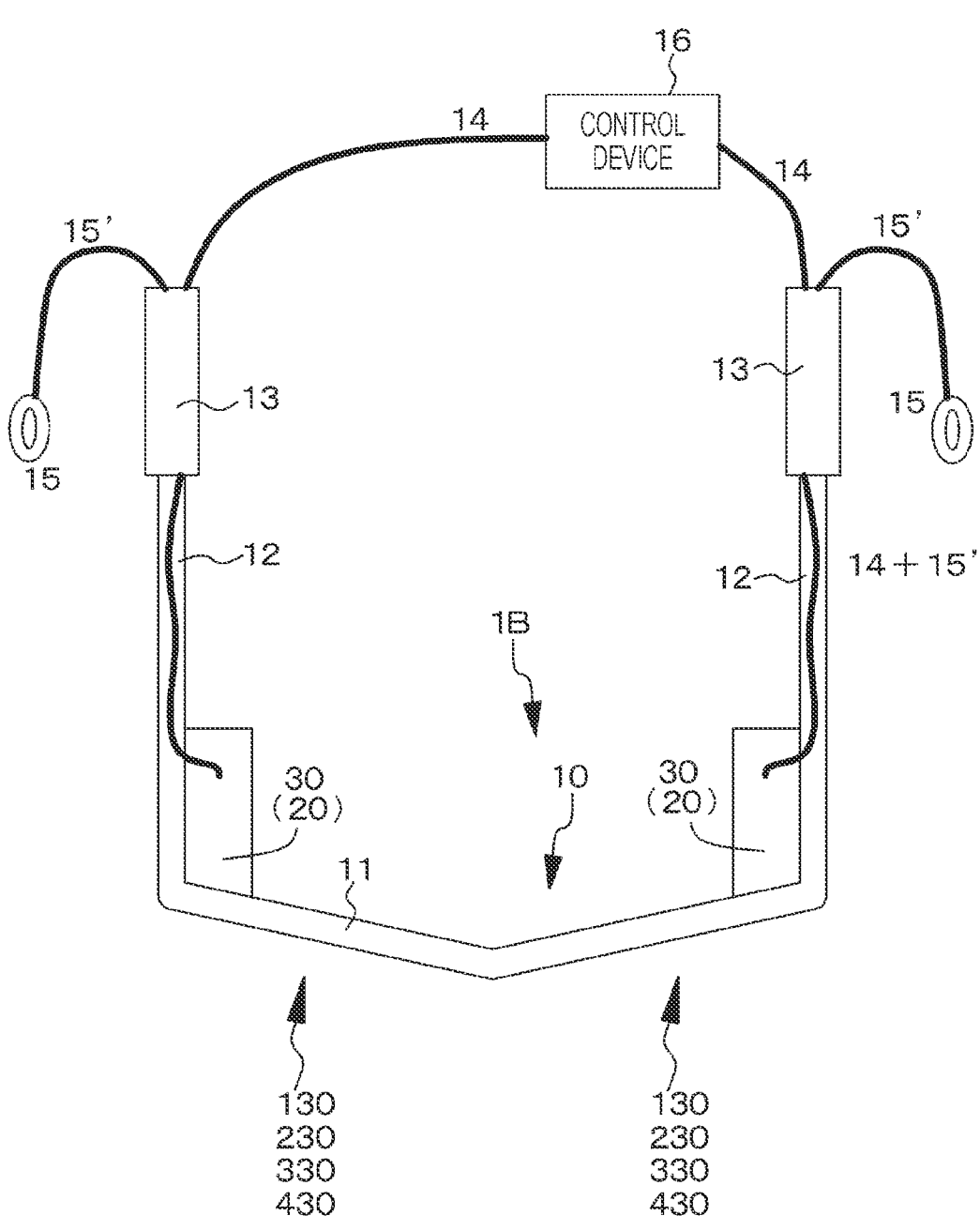
FIG. 18 is a schematic view of the display device of the fifth embodiment as viewed from above.

A schematic view of a transparent member and an image display device in a display device 1B of the fifth embodiment as a modification of the first embodiment as viewed from the observer side is illustrated in FIG. 16. A schematic cross-sectional view when the transparent member and the image display device in the display device 1B of the fifth embodiment are cut in the XZ virtual plane is similar to FIGS. 1A and 2. Furthermore, a schematic view of the display device 1B of the first embodiment as viewed from the front is illustrated in FIG. 17, and a schematic view of the display device 1B of the first embodiment as viewed from above is illustrated in FIG. 18. In FIG. 16, in order to simplify the drawing, only the light reflecting segments 141 positioned near both ends of the transparent member 130 in the X direction are illustrated. As described above, the display device 1B of the fifth embodiment can be similar to those of the first to fourth embodiments or the modifications thereof except that the arrangement position of the image display device 20 is different, and thus detailed description is omitted.

Note that, in the fifth embodiment, a mode can be employed in which the light reflecting segments are inclined from a first end portion 141N far from the observer and close to the second surface and close to the light incident surface toward a second end portion 141F close to the observer and close to the first surface and far from the light incident surface, or a mode can be employed in which the light reflecting segments are inclined from a first end portion close to the observer and close to the first surface and close to the light incident surface toward a second end portion away from the observer and close to the second surface and far from the light incident surface. Then, when a size of the light reflecting segment that is provided in a region close to the light incident surface is assumed as $S_N$, and a size of the light reflecting segment that is provided in a region far from the light incident surface is assumed as $S_F$, $$S_N < S_F$$

is satisfied, but in other words, it can be said that the sizes of the light reflecting segments change (specifically, increase) along the inclination direction (the inclination direction from the first end portion toward the second end portion).

Furthermore, when an arrangement pitch along the Y direction parallel to the Y axis of the light reflecting segment that is provided in the region close to the light incident surface is assumed as $P_{N-Y}$, and an arrangement pitch along the Y direction parallel to the Y axis of the light reflecting segment that is provided in the region far from the light incident surface is assumed as $P_{F-Y}$, $$P_{N-Y} > P_{F-Y}$$

is satisfied, but in other words, it can be said that the arrangement pitches of the light reflecting segments in the direction orthogonal to the inclination direction change (specifically, decrease) along the inclination direction.

Although the present disclosure has been described above on the basis of preferred embodiments, the present disclosure is not limited to these embodiments. The configurations and structures of the display device (head mounted display), the image display device, the transparent member, and the light reflecting portion described in the embodiment are examples, and can be appropriately changed.

Note that the present disclosure can also employ the following configurations.

[A01]<<Display device . . . first aspect>>

A display device, including:

an image display device;

a plate-shaped transparent member; and a light reflecting portion, in which the transparent member includes a first surface facing an observer who observes an image, a light incident surface on which light emitted from the image display device is incident, and a second surface that faces the first surface and totally reflects the light incident from the light incident surface, the first surface includes a first portion and a second portion, the second portion is located in a region close to the light incident surface, the first portion extends from the second portion and is located in a region far from the light incident surface, the light reflecting portion is provided inside the transparent member corresponding to the first portion of the first surface of the transparent member or in the first portion of the first surface of the transparent member, a part of the light emitted from the image display device is incident from the light incident surface, totally reflected by the second surface, further reflected by the light reflecting portion, emitted from the first portion of the first surface, and reaches a pupil of the observer, and another part of the light emitted from the image display device is incident from the light incident surface, collides with the second portion of the first surface, and does not reach the pupil of the observer.

[A02] The display device according to [A01], in which the light reflecting portion includes a plurality of light reflecting segments.

[A03] The display device according to [A02], in which a portion where a light beam emitted from a center of the image display device and perpendicularly incident on the pupil of the observer is emitted from the transparent member is referred to as a center of the transparent member, an orthogonal projection image of a trace of a light beam emitted from the center of the image display device in the transparent member on the second surface is assumed as an X axis, a normal line of the second surface passing through the center of the transparent member is assumed as a Z axis, and an axis orthogonal to the X axis and the Z axis is assumed as a Y axis, when an arrangement pitch along a Y direction parallel to the Y axis of the light reflecting segment that is provided in the region close to the light incident surface is assumed as $P_{N-Y}$, and an arrangement pitch along the Y direction parallel to the Y axis of the light reflecting segment that is provided in the region far from the light incident surface is assumed as $P_{F-Y}$, $$P_{N-Y} > P_{F-Y}$$

is satisfied.

[A04] The display device according to [A02] or [A03], in which when a size of the light reflecting segment that is provided in the region close to the light incident surface is assumed as $S_N$, and a size of the light reflecting segment that is provided in the region far from the light incident surface is assumed as $S_F$, $$S_N < S_F$$

is satisfied.

[A05] The display device according to any one of [A02] to [A04], in which the light reflecting segments are inclined from a first end portion far from the observer and close to the second surface and close to the light incident surface toward a second end portion close to the observer and close to the first surface and far from the light incident surface.

[A06] The display device according to any one of [A02] to [A04], in which a reflecting surface is disposed at an end portion of the transparent member facing the light incident surface or near the end portion, and a part of the light emitted from the image display device is incident from the light incident surface, totally reflected by the second surface, reflected by the reflecting surface, further reflected by the light reflecting portion, emitted from the first portion of the first surface, and reaches the pupil of the observer.

[A07] The display device according to [A06], in which the light reflecting segments are inclined from a first end portion close to the observer and close to the first surface and close to the light incident surface toward a second end portion away from the observer and close to the second surface and far from the light incident surface.

[A08] The display device according to any one of [A02] to [A07], in which the light reflecting segments each include a light reflecting layer including a metal reflecting film, an alloy reflecting film, or a dielectric multilayer film.

[A09] The display device according to any one of [A02] to [A07], in which the light reflecting segments each have a stacked structure of a light reflecting layer and a light absorbing layer.

[A10] The display device according to any one of [A01] to [A09], in which a light transmission ratio of external light in a Z direction of a portion of the transparent member including the light reflecting portion is 0.7 or more.

[A11] The display device according to any one of [A01] to [A10], in which a light absorbing film is formed on an outer surface of the second surface.

[A12] The display device according to any one of [A01] to [A11], in which the image display device includes a plurality of pixels arranged in a two-dimensional matrix in a $\zeta$ direction corresponding to an X direction and an $\eta$ direction corresponding to the Y direction.

[A13] The display device according to any one of [A01] to [A12], in which the image display device is located above the transparent member with respect to the observer.

[A14] The display device according to any one of [A01] to [A12], in which the image display device is located closer to an ear side of the observer than the transparent member.

[A15]<<Display device . . . second aspect>>

A display device, including:

an image display device;

a plate-shaped transparent member; and a light reflecting portion, in which the transparent member includes a first surface facing an observer who observes an image, a light incident surface on which light emitted from the image display device is incident, and a second surface that faces the first surface and totally reflects light incident from the light incident surface, the light reflecting portion is provided inside the transparent member or on the first surface of the transparent member, the light emitted from the image display device is incident from the light incident surface, totally reflected by the second surface, further reflected by the light reflecting portion, emitted from the first surface, and reaches a pupil of the observer, and the light reflecting portion includes a plurality of light reflecting segments, and when a size of the light reflecting segment that is provided in a region close to the light incident surface is assumed as $S_N$, and a size of the light reflecting segment that is provided in a region far from the light incident surface is assumed as $S_F$, $$S_N < S_F$$

is satisfied.

[A16] The display device according to [A15], in which a portion where a light beam emitted from a center of the image display device and perpendicularly incident on the pupil of the observer is emitted from the transparent member is referred to as a center of the transparent member, an orthogonal projection image of a trace of a light beam emitted from the center of the image display device in the transparent member on the second surface is assumed as an X axis, a normal line of the second surface passing through the center of the transparent member is assumed as a Z axis, and an axis orthogonal to the X axis and the Z axis is assumed as a Y axis, when an arrangement pitch along a Y direction parallel to the Y axis of the light reflecting segment that is provided in the region close to the light incident surface is assumed as $P_{N-Y}$, and an arrangement pitch along the Y direction parallel to the Y axis of the light reflecting segment that is provided in the region far from the light incident surface is assumed as $P_{F-Y}$, $$P_{N-Y} > P_{F-Y}$$

is satisfied.

[A17]<<Display device . . . third aspect>>

A display device, including:

an image display device;

a plate-shaped transparent member; and a light reflecting portion, in which the transparent member includes a first surface facing an observer who observes an image, a light incident surface on which light emitted from the image display device is incident, and a second surface that faces the first surface and totally reflects light incident from the light incident surface, the light reflecting portion is provided inside the transparent member or on the first surface of the transparent member, the light emitted from the image display device is incident from the light incident surface, totally reflected by the second surface, further reflected by the light reflecting portion, emitted from the first surface, and reaches a pupil of the observer, the light reflecting portion includes a plurality of light reflecting segments, a portion where a light beam emitted from a center of the image display device and perpendicularly incident on the pupil of the observer is emitted from the transparent member is referred to as a center of the transparent member, an orthogonal projection image of a trace of a light beam emitted from the center of the image display device in the transparent member on the second surface is assumed as an X axis, a normal line of the second surface passing through the center of the transparent member is assumed as a Z axis, and an axis orthogonal to the X axis and the Z axis is assumed as a Y axis, when an arrangement pitch along a Y direction parallel to the Y axis of the light reflecting segment that is provided in the region close to the light incident surface is assumed as $P_{N\text{-}Y}$, and an arrangement pitch along the Y direction parallel to the Y axis of the light reflecting segment that is provided in the region far from the light incident surface is assumed as $P_{F\text{-}Y}$, $$P_{N\text{-}Y} > P_{F\text{-}Y}$$

is satisfied.

REFERENCE SIGNS LIST 1A, 1B Display device
10 Frame
11 Front portion
12 Temple portion
13 Temple tip (tip cell, earpiece, ear pad)
14 Wiring (signal line, power line, or the like)
15 Headphone part
15' Wiring for headphone part
16 Control device (control circuit, control means)
17 Nose pad portion
20 Image display device
30 Housing
31A Housing
31B Organic EL display device
31C First convex lens
31D Second convex lens
31E Diaphragm
32A Housing
32B Light source
32C Polarizing beam splitter
32D Liquid crystal display device (LCD)
32E Optical system (parallel light emitting optical system, collimating optical system)
33A Housing
33B Light source
33C Scanning means
33D Lens system
130, 230, 330, 430 Transparent member
131, 231, 331, 431 First surface of transparent member
131A First portion of first surface of transparent member
131B Second portion of first surface of transparent member
131C Light reflecting film
131D Light absorbing material layer
131E Multilayer film
131F Uneven portion (fine uneven portion)
131F' First inclined surface of uneven portion
131F'' Second inclined surface of uneven portion 132, 232, 332, 432 Second surface of transparent member
133, 233, 333, 433 Light incident surface of transparent member
134, 234, 434 End surface of transparent member
334' Reflecting surface (concave surface portion)
140, 240, 340, 440 Light reflecting portion
141, 241, 341, 441 Light reflecting segment
$141_{UP\text{-}1}$, $141_{UP\text{-}2}$ First end portion (upper end portion) of light reflecting segment
$141_{DN\text{-}1}$, $141_{DN\text{-}2}$ Second end portion (lower end portion) of light reflecting segment
251, 252, 253, 254, 255, 256, 257, 258 Transparent member segment
60 Observer
61 Eyeball (pupil)

The invention claimed is:

1. A display device, comprising:
an image display device configured to emit light;
a plate-shaped transparent member; and
a light reflecting portion, wherein
the plate-shaped transparent member includes:
a first surface facing an observer who observes an image;
a light incident surface on which the light emitted from the image display device is incident; and
a second surface that faces the first surface, wherein the second surface is configured to totally reflect the light incident from the light incident surface,
the first surface includes a first portion and a second portion,
the second portion is in a region close to the light incident surface,
the first portion extends from the second portion and is in a region far from the light incident surface,
the light reflecting portion is one of inside the plate-shaped transparent member corresponding to the first portion of the first surface of the plate-shaped transparent member or in the first portion of the first surface of the plate-shaped transparent member,
a first part of the light emitted from the image display device is incident from the light incident surface, totally reflected by the second surface, further reflected by the light reflecting portion, emitted from the first portion of the first surface, and reaches a pupil of the observer,
a second part of the light emitted from the image display device is incident from the light incident surface, collides with the second portion of the first surface, and does not reach the pupil of the observer,
the light reflecting portion includes a plurality of light reflecting segments, and
$S_N < S_F$ is satisfied,
where a size of a first light reflecting segment of the plurality of light reflecting segments that is in the region close to the light incident surface is $S_N$, and a size of a second light reflecting segment of the plurality of light reflecting segments that is in the region far from the light incident surface is $S_F$.

2. The display device according to claim 1, wherein
a portion where a light beam emitted from a center of the image display device and perpendicularly incident on the pupil of the observer is emitted from the plate-shaped transparent member is referred to as a center of the plate-shaped transparent member,
an orthogonal projection image of a trace of the light beam emitted from the center of the image display device in the plate-shaped transparent member on the second surface is assumed as an X axis, a normal line of the second surface passing through the center of the plate-shaped transparent member is assumed as a Z axis, an axis orthogonal to the X axis and the Z axis is assumed as a Y axis, and $P_{N\text{-}Y} > P_{F\text{-}Y}$ is satisfied, where an arrangement pitch along a Y direction parallel to the Y axis of the first light reflecting segment that is in the region close to the light incident surface is $P_{N\text{-}Y}$, and an arrangement pitch along the Y direction parallel to the Y axis of the second light reflecting segment that is in the region far from the light incident surface is $P_{F\text{-}Y}$.

3. The display device according to claim 1, wherein the plurality of light reflecting segments is inclined from a first end portion of the plurality of light reflecting segments toward a second end portion of the plurality of light reflecting segments, the first end portion is far from the observer and close to the second surface, and close to the light incident surface, and the second end portion is close to the observer and the first surface, and far from the light incident surface.

4. The display device according to claim 1, wherein the plate-shaped transparent member further includes a reflecting surface at one of an end portion of the plate-shaped transparent member facing the light incident surface or near the end portion of the plate-shaped transparent member, and the first part of the light emitted from the image display device is incident from the light incident surface, totally reflected by the second surface, reflected by the reflecting surface, further reflected by the light reflecting portion, emitted from the first portion of the first surface, and reaches the pupil of the observer.

5. The display device according to claim 4, wherein the plurality of light reflecting segments is inclined from a first end portion of the plurality of light reflecting segments toward a second end portion of the plurality of light reflecting segments, the first end portion is close to the observer, the first surface, the light incident surface, and the second end portion is away from the observer, close to the second surface, and far from the light incident surface.

6. The display device according to claim 1, wherein each light reflecting segment of the plurality of light reflecting segments includes a light reflecting layer, and the light reflecting layer includes one of a metal reflecting film, an alloy reflecting film, or a dielectric multilayer film.

7. The display device according to claim 1, wherein each light reflecting segment of the plurality of light reflecting segments has a stacked structure of a light reflecting layer and a light absorbing layer.

8. The display device according to claim 1, wherein a light transmission ratio of external light in a Z direction of a portion of the plate-shaped transparent member including the light reflecting portion is 0.7 or more.

9. The display device according to claim 1, wherein the second surface includes a light absorbing film on an outer surface of the second surface.

10. The display device according to claim 1, wherein the image display device includes a plurality of pixels in a two-dimensional matrix arrangement in a $\zeta$ direction corresponding to an X direction and an $\eta$ direction corresponding to a Y direction.

11. The display device according to claim 1, wherein the image display device is above the plate-shaped transparent member with respect to the observer.

12. The display device according to claim 1, wherein the image display device is closer to an ear side of the observer than the plate-shaped transparent member.

13. A display device, comprising:

an image display device configured to emit light;

a plate-shaped transparent member; and a light reflecting portion, wherein the plate-shaped transparent member includes:

a first surface facing an observer who observes an image;

a light incident surface on which the light emitted from the image display device is incident; and a second surface that faces the first surface, wherein the second surface is configured to totally reflect the light incident from the light incident surface, the light reflecting portion is one of inside the plate-shaped transparent member or on the first surface of the plate-shaped transparent member, the light emitted from the image display device is incident from the light incident surface, totally reflected by the second surface, further reflected by the light reflecting portion, emitted from the first surface, and reaches a pupil of the observer, the light reflecting portion includes a plurality of light reflecting segments, and $S_N < S_F$ is satisfied, where a size of a first light reflecting segment of the plurality of light reflecting segments that is in a region close to the light incident surface is $S_N$, and a size of a second light reflecting segment of the plurality of light reflecting segments that is in a region far from the light incident surface is $S_F$.

14. The display device according to claim 13, wherein a portion where a light beam emitted from a center of the image display device and perpendicularly incident on the pupil of the observer is emitted from the plate-shaped transparent member is referred to as a center of the plate-shaped transparent member, an orthogonal projection image of a trace of the light beam emitted from the center of the image display device in the plate-shaped transparent member on the second surface is assumed as an X axis, a normal line of the second surface passing through the center of the plate-shaped transparent member is assumed as a Z axis, an axis orthogonal to the X axis and the Z axis is assumed as a Y axis, and $P_{N\text{-}Y} > P_{F\text{-}Y}$ is satisfied, where an arrangement pitch along a Y direction parallel to the Y axis of the first light reflecting segment that is in the region close to the light incident surface is $P_{N\text{-}Y}$, and an arrangement pitch along the Y direction parallel to the Y axis of the second light reflecting segment that is in the region far from the light incident surface is $P_{F\text{-}Y}$.

15. A display device, comprising:

an image display device configured to emit light;

a plate-shaped transparent member; and a light reflecting portion, wherein the plate-shaped transparent member includes:

a first surface facing an observer who observes an image;

a light incident surface on which the light emitted from the image display device is incident; and a second surface that faces the first surface, wherein the second surface is configured to totally reflect the light incident from the light incident surface, the light reflecting portion is one of inside the plate-shaped transparent member or on the first surface of the plate-shaped transparent member, the light emitted from the image display device is incident from the light incident surface, totally reflected by the second surface, further reflected by the light reflecting portion, emitted from the first surface, and reaches a pupil of the observer, the light reflecting portion includes a plurality of light reflecting segments, a portion where a light beam emitted from a center of the image display device and perpendicularly incident on the pupil of the observer is emitted from the plate-shaped transparent member is referred to as a center of the plate-shaped transparent member, an orthogonal projection image of a trace of the light beam emitted from the center of the image display device in the plate-shaped transparent member on the second surface is assumed as an X axis, a normal line of the second surface passing through the center of the plate-shaped transparent member is assumed as a Z axis, an axis orthogonal to the X axis and the Z axis is assumed as a Y axis, and $P_{N-Y} > P_{F-Y}$ is satisfied, where an arrangement pitch along a Y direction parallel to the Y axis of a first light reflecting segment of the plurality of light reflecting segments that is in a region close to the light incident surface is $P_{N-Y}$, and an arrangement pitch along the Y direction parallel to the Y axis of a second light reflecting segment of the plurality of light reflecting segments that is in a region far from the light incident surface is $P_{F-Y}$.

* * * * *